US012796724B2

(12) United States Patent
Chang et al.

(10) Patent No.: US 12,796,724 B2
(45) Date of Patent: Nov. 17, 2026

(54) SYSTEM FOR MANUFACTURING EDIBLE FOOD PRODUCTS AND METHOD FOR MANUFACTURING EDIBLE FOOD PRODUCTS USING SAME

(71) Applicant: CJ CHEILJEDANG CORPORATION, Seoul (KR)

(72) Inventors: Duk Jin Chang, Seoul (KR); Min Soo Lim, Seoul (KR); Seung Yong Kim, Gyeonggi-do (KR); Yong Ho Jeon, Gyeonggi-do (KR); Sang Oh Kim, Gyeonggi-do (KR); Myoung Il Kwak, Gyeonggi-do (KR); Jong Hwa Lee, Gyeonggi-do (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 464 days.

(21) Appl. No.: 18/270,343

(22) PCT Filed: Dec. 28, 2021

(86) PCT No.: PCT/KR2021/020039

§ 371 (c)(1),
(2) Date: Jun. 29, 2023

(87) PCT Pub. No.: WO2022/145965

PCT Pub. Date: Jul. 7, 2022

(65) Prior Publication Data

US 2024/0099354 A1 Mar. 28, 2024

(30) Foreign Application Priority Data

Dec. 29, 2020 (KR) ........................ 10-2020-0186724

(51) Int. Cl.

*A23P 20/20* (2016.01)
*A23L 17/60* (2016.01)
*A23P 30/00* (2016.01)

(52) U.S. Cl.

CPC ............... *A23P 20/20* (2016.08); *A23L 17/60* (2016.08); *A23P 30/00* (2016.08); *A23V 2002/00* (2013.01); *A23V 2300/31* (2013.01)

(58) Field of Classification Search

CPC .......... A23P 20/20; A23P 30/00; A23L 17/60; A23V 2002/00; A23V 2300/31

See application file for complete search history.

(56) References Cited

U.S. PATENT DOCUMENTS 7,107,123 B2 9/2006 Watanabe et al.
9,902,083 B2 * 2/2018 Long ................ A61F 13/15707

(Continued)

FOREIGN PATENT DOCUMENTS

CN 203538312 U 4/2014
CN 107223018 A 9/2017

(Continued)

OTHER PUBLICATIONS

Machine English translation of JP-2007300848-A (Year: 2007).*

(Continued)

*Primary Examiner* — Erwin J Wunderlich
(74) *Attorney, Agent, or Firm* — Morgan, Lewis & Bockius LLP

(57) ABSTRACT

The present disclosure relates a system for manufacturing edible food products. The system for manufacturing edible food products may include a first food ingredient supply apparatus that separates a single sheet of a first food ingredient from a first food ingredient stack including a plurality of stacked first food ingredients and supplies the single sheet of first food ingredient, a second food ingredient supply (Continued)

apparatus that separates a single sheet of a second food ingredient from a second food ingredient stack including a plurality of stacked second food ingredients and supplies the single sheet of second food ingredient, and a pressing device that forms an edible food product by pressing a semi-finished product formed by seating the supplied single sheet of the first food ingredient on the supplied single sheet of the second food ingredient.

14 Claims, 27 Drawing Sheets

(56) References Cited

U.S. PATENT DOCUMENTS

| | | | | |
|---|---|---|---|---|
| 10,434,676 | B2 * | 10/2019 | Kuendgen | B26D 7/1863 |
| 10,645,960 | B2 | 5/2020 | Kim et al. | |
| 2003/0075051 | A1 | 4/2003 | Watanabe et al. | |
| 2003/0190394 | A1 * | 10/2003 | Suzuki | A23N 12/08 426/523 |
| 2010/0196564 | A1 | 8/2010 | Cepeda Mendoza et al. | |
| 2015/0135925 | A1 * | 5/2015 | Abrahams | B26D 7/204 83/659 |
| 2015/0299021 | A1 * | 10/2015 | Itoh | C03B 33/0235 83/887 |
| 2018/0271124 | A1 * | 9/2018 | Kim | A23L 7/122 |
| 2019/0037858 | A1 * | 2/2019 | Weinstein | A23P 30/25 |
| 2019/0350249 | A1 * | 11/2019 | Bando | A23P 20/20 |
| 2024/0083059 | A1 * | 3/2024 | Chang | B26D 1/40 |
| 2024/0101369 | A1 * | 3/2024 | Chang | A23G 3/48 |
| 2024/0277004 | A1 * | 8/2024 | Chen | A23J 3/14 |

FOREIGN PATENT DOCUMENTS

| | | | | |
|---|---|---|---|---|
| CN | 109673978 | A * | 4/2019 | A23L 17/60 |
| CN | 208883187 | U | 5/2019 | |
| JP | 2003-128002 | A | 5/2003 | |
| JP | 3532878 | B2 | 5/2004 | |
| JP | 3577055 | B2 | 10/2004 | |
| JP | 2006-123096 | A | 5/2006 | |
| JP | 2006-264697 | A | 10/2006 | |
| JP | 2007300848 | A * | 11/2007 | |
| JP | 4726674 | B2 | 7/2011 | |
| JP | 2016-009723 | A | 1/2016 | |
| JP | 2018-525970 | A | 9/2018 | |
| KR | 20-0344111 | Y1 | 3/2004 | |
| KR | 10-0515442 | B1 | 9/2005 | |
| KR | 10-1106737 | B1 | 1/2012 | |
| KR | 10-1148180 | B1 | 5/2012 | |
| KR | 10-2012-0078845 | A | 7/2012 | |
| KR | 10-1186146 | B1 | 9/2012 | |
| KR | 10-1240421 | B1 | 3/2013 | |
| KR | 10-1262040 | B1 | 5/2013 | |
| KR | 10-1262694 | B1 | 5/2013 | |
| KR | 10-1265702 | B1 | 5/2013 | |
| KR | 10-2013-0104473 | A | 9/2013 | |
| KR | 10-1353587 | B1 | 1/2014 | |
| KR | 10-1466001 | B1 | 11/2014 | |
| KR | 10-1520905 | B1 | 5/2015 | |
| KR | 10-2016-0100676 | A | 8/2016 | |
| KR | 10-1757778 | B1 | 7/2017 | |
| KR | 10-1762810 | B1 | 7/2017 | |
| KR | 101769345 | B1 * | 8/2017 | A23L 17/60 |
| KR | 10-1774097 | B1 | 9/2017 | |
| KR | 10-1827479 | B1 | 2/2018 | |
| KR | 10-1834643 | B1 | 3/2018 | |
| KR | 10-2018-0121714 | A | 11/2018 | |
| KR | 10-1940961 | B1 | 1/2019 | |
| KR | 10-1956475 | B1 | 3/2019 | |
| KR | 10-2111863 | B1 | 6/2020 | |
| TW | 579280 | B | 3/2004 | |

OTHER PUBLICATIONS

Machine English translation of KR-101769345-B1 (Year: 2017).*
Machine English translation of CN-109673978-A (Year: 2019).*
International Search Report issued in corresponding International Patent Application No. PCT/KR2021/020039 dated Apr. 11, 2022.
Office Action issued in corresponding Chinese Patent Application No. 202180088449.6, dated Jul. 16, 2025.
Office Action issued Jul. 19, 2023 for counterpart Korean Patent Application No. 10-2020-0186724 (See English Translation).
Office Action issued in corresponding Japanese Patent Application No. 2023-540509, dated Jul. 23, 2024.

* cited by examiner

SYSTEM FOR MANUFACTURING EDIBLE FOOD PRODUCTS AND METHOD FOR MANUFACTURING EDIBLE FOOD PRODUCTS USING SAME

TECHNICAL FIELD

The present disclosure relates to a system for manufacturing edible food products and a method for manufacturing edible food products using the same.

BACKGROUND ART

Food ingredients need to be delicately treated to make sheet-type edible food products by processing thin food ingredients. In case that the food ingredients are not delicately treated, the food ingredients are torn, wrinkled, or deformed, and subsequent processes may not be normally performed, which may cause the discontinuation of the process and the deterioration in productivity. In case that skilled operators process the food ingredients, it is possible to make edible food products while minimizing a loss of material and production time. However, in case that non-skilled operators perform the work or the work is performed by a machine that is not appropriately designed, the food ingredients cannot be delicately treated, which may cause damage to food ingredient and the deterioration in productivity.

In general, to make edible food products by using thin food ingredients, it is possible to use a method of receiving food ingredients in the form of a stack, which is made by stacking a plurality of food ingredients, separating pieces of food ingredients from the stack, and then performing predetermined processing. In this process, the food ingredients particularly need to be treated delicately.

For example, it is possible to make seaweed snacks, which are examples of sheet-type edible food products, by using seaweed and rice paper which are thin food ingredients. The two food ingredients are identical to each other in that both the food ingredients are thin food ingredients. However, because the seaweed and the rice paper have different physical properties, the seaweed and the rice paper need to be treated in different ways.

Meanwhile, the seaweed snack may be processed by being cut into small units having proper sizes so that consumers may easily eat the seaweed snack. However, because of the nature of seaweed, particles, such as debris, are produced during the cutting process and accumulated on or trapped in a cutting apparatus during the repeated process, which may hinder a smooth operation.

DISCLOSURE

Technical Problem

The present disclosure has been made in an effort to solve the above-mentioned problems, and an object of the present disclosure is to provide a system and method for manufacturing edible food products, which are capable of shortening the time required to produce edible food products, reducing a defect in a production process, and improving productivity.

Technical Solution

A system for manufacturing edible food products according to an embodiment of the present disclosure includes: a first food ingredient supply apparatus configured to separate a single sheet of a first food ingredient from a first food ingredient stack including a plurality of stacked first food ingredients and supply the single sheet of first food ingredient; a second food ingredient supply apparatus configured to separate a single sheet of a second food ingredient from a second food ingredient stack including a plurality of stacked second food ingredients and supply the single sheet of second food ingredient; and a pressing device configured to form an edible food product by pressing a semi-finished product formed by seating the supplied single sheet of the first food ingredient on the supplied single sheet of the second food ingredient.

A method of manufacturing edible food products according to another embodiment of the present disclosure includes: separating a single sheet of a first food ingredient from a plurality of stacked first food ingredients; separating a single sheet of a second food ingredient from a plurality of stacked second food ingredients; forming a semi-finished product by seating the separated single sheet of the first food ingredient on the supplied single sheet of the second food ingredient; and forming an edible food product by pressing the semi-finished product.

Advantageous Effects

Accordingly, it is possible to shorten the time required to produce the edible food products, reduce a defect occurring during the process of producing the edible food products, and improve the productivity.

MODE FOR DISCLOSURE

Figure 1:
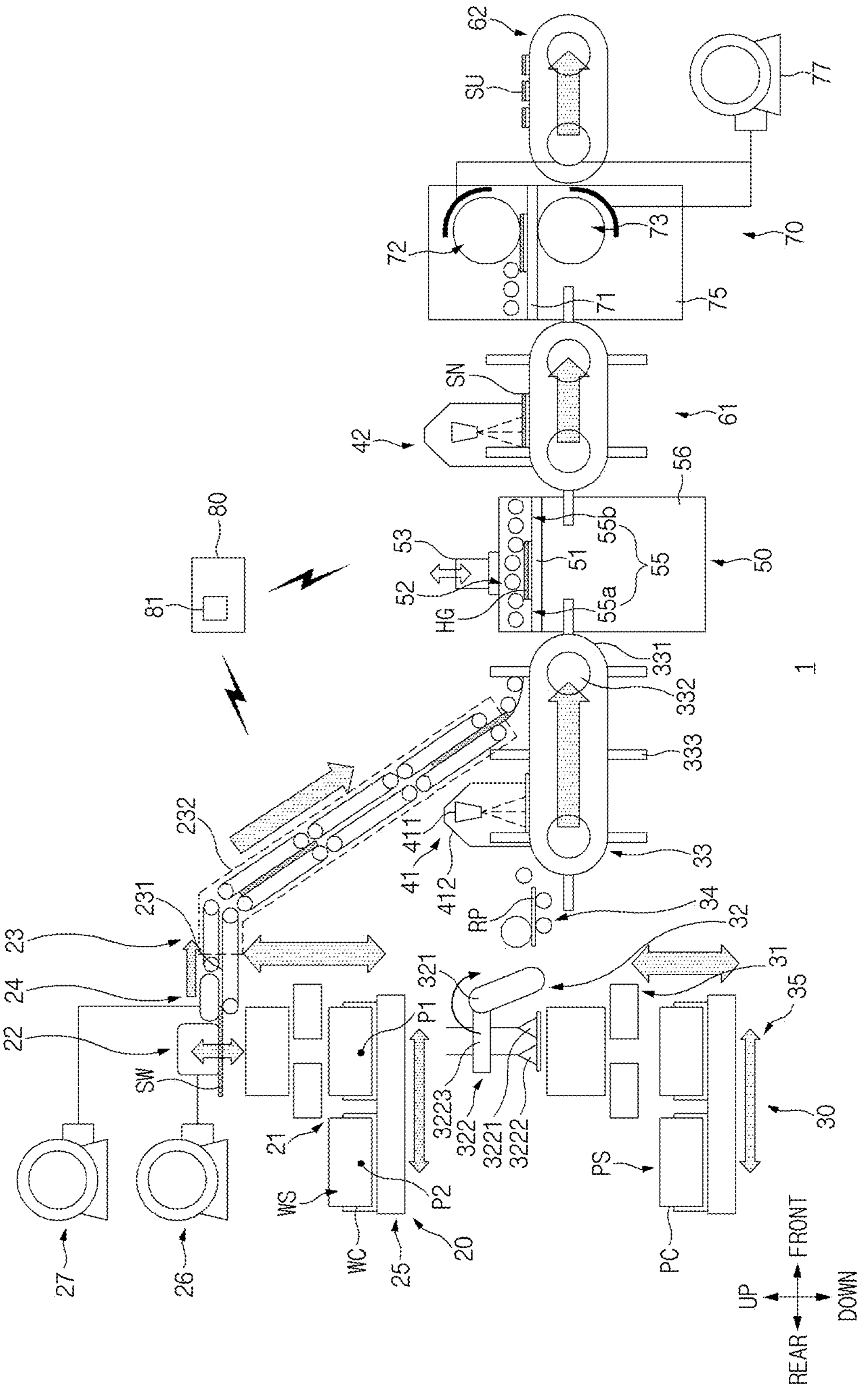
FIG. 1 is a conceptual view of a system for manufacturing edible food products according to an embodiment of the present disclosure.

Hereinafter, some embodiments of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. Further, in the following description of the embodiments of the present disclosure, a detailed description of related publicly-known configurations or functions will be omitted when it is determined that the detailed description obscures the understanding of the embodiments of the present disclosure.

In addition, the terms first, second, A, B, (a), and (b) may be used to describe constituent elements of the embodiments of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

Figure 2:
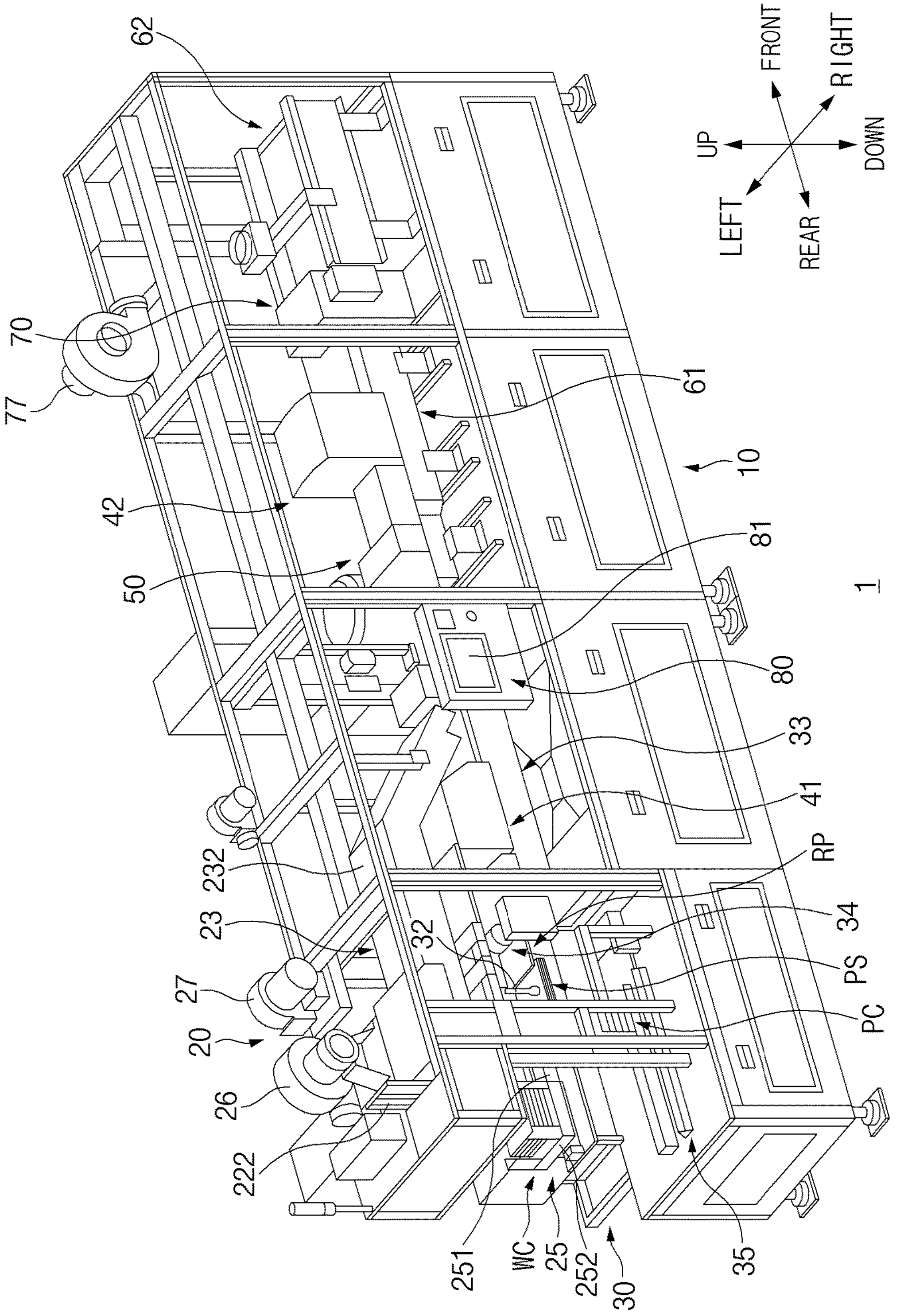
FIG. 2 is a perspective view of the system for manufacturing edible food products according to the embodiment of the present disclosure.
Figure 3:
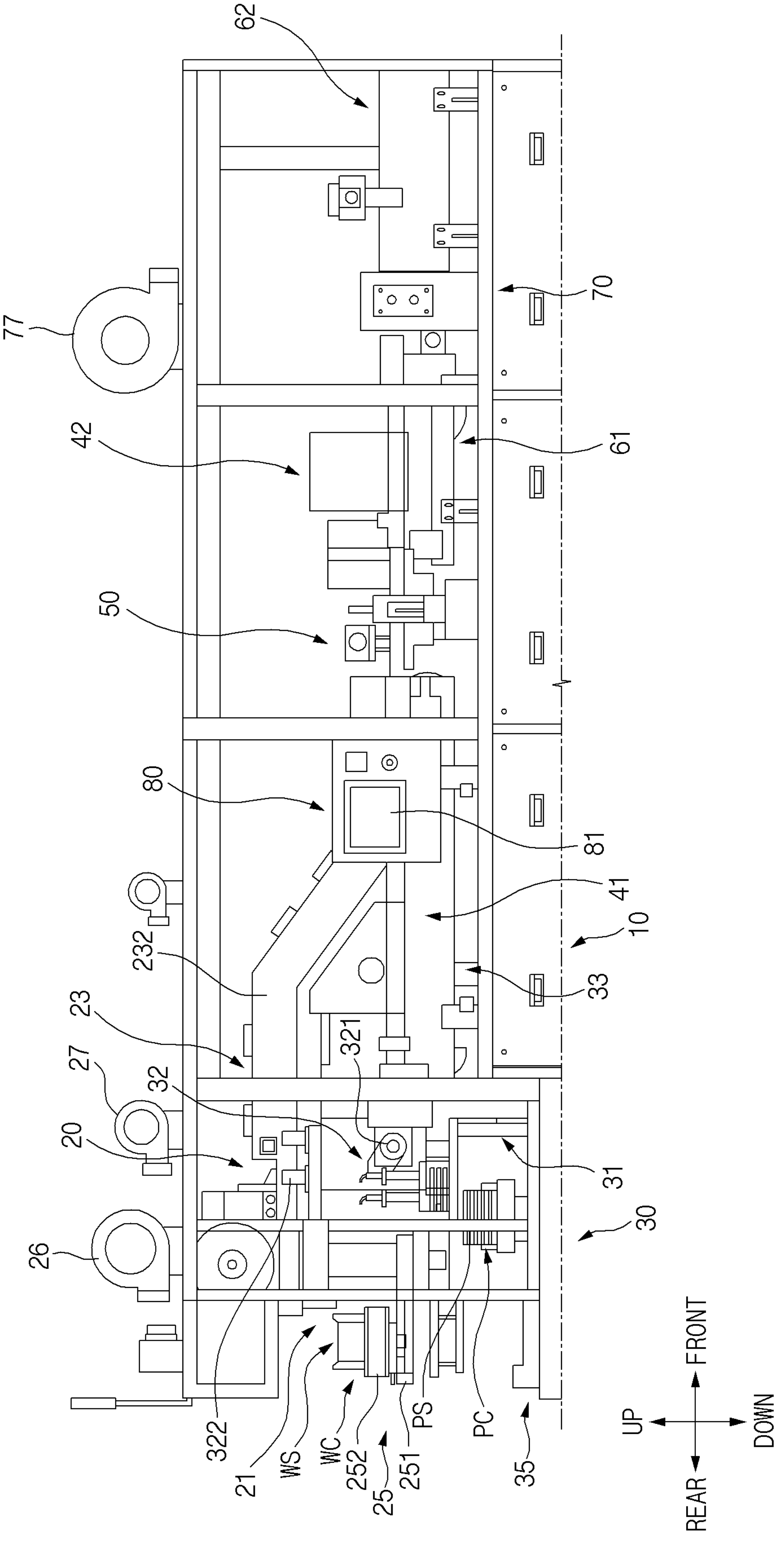
FIG. 3 is a right side view of the system for manufacturing edible food products according to the embodiment of the present disclosure.
Figure 4:
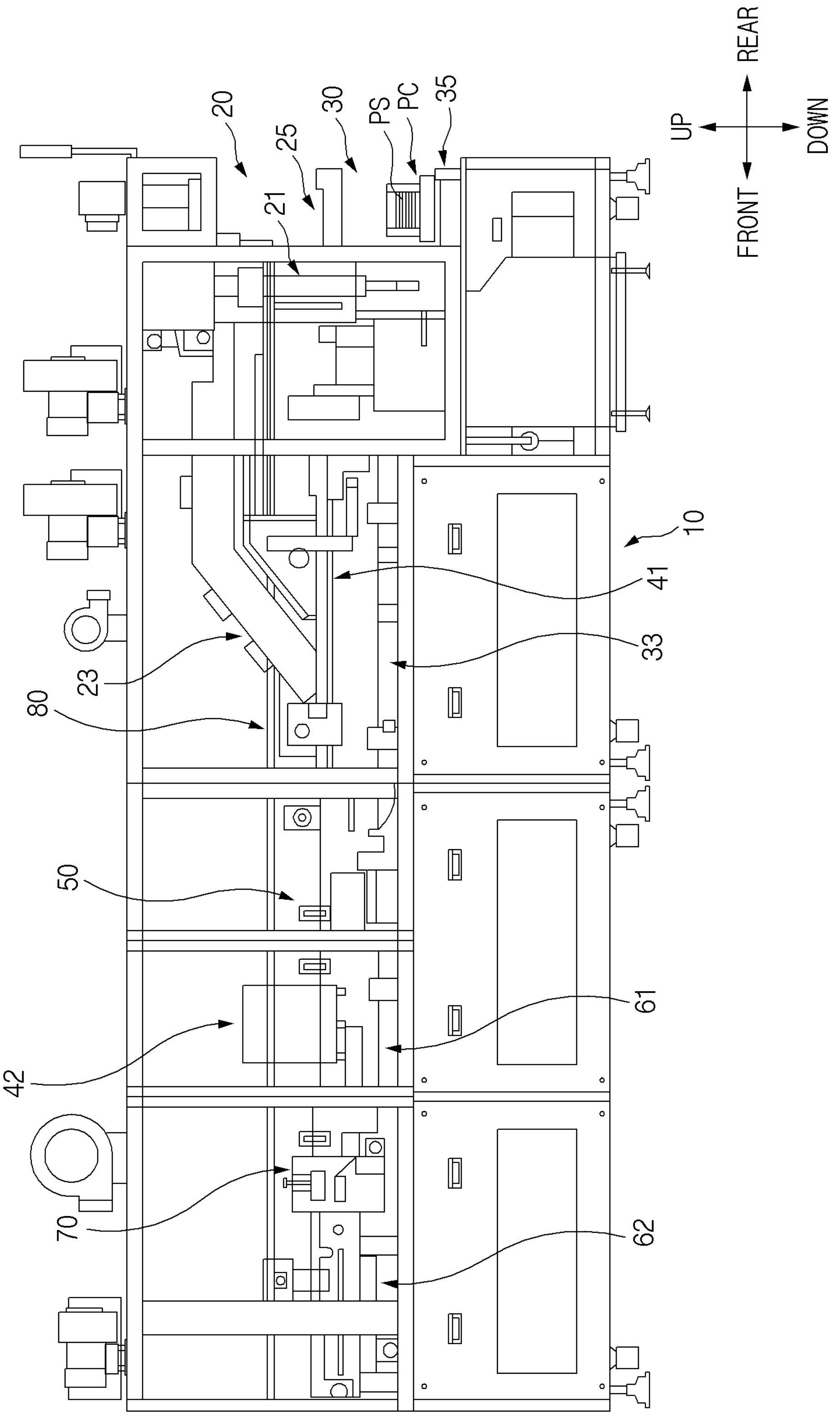
FIG. 4 is a left side view of the system for manufacturing edible food products according to the embodiment of the present disclosure.

FIG. 1 is a conceptual view of a system 1 for manufacturing edible food products according to an embodiment of the present disclosure. FIG. 2 is a perspective view of the system 1 for manufacturing edible food products according to the embodiment of the present disclosure. FIG. 3 is a right side view of the system 1 for manufacturing edible food products according to the embodiment of the present disclosure. FIG. 4 is a left side view of the system 1 for manufacturing edible food products according to the embodiment of the present disclosure.

Referring to the drawings, the system 1 for manufacturing edible food products according to the embodiment of the present disclosure includes a first food ingredient supply apparatus 20, a second food ingredient supply apparatus 30, and a pressing device 50. The system 1 for manufacturing edible food products according to the embodiment of the present disclosure may include a system frame 10, a joining agent spray device 41, an auxiliary joining agent spray device 42, an intermediate conveyor 61, an unloading conveyor 62, a cutting apparatus 70, and a processor 80.

In the present specification, a forward/rearward direction, a leftward/rightward direction, and an upward/downward direction are defined for convenience of description and may be orthogonal to one another. However, these directions are defined relative to the direction in which the system 1 for manufacturing edible food products is arranged. The upward/downward direction may not necessarily mean a vertical direction.

The edible food products produced by the system 1 for manufacturing edible food products according to the embodiment of the present disclosure may be seaweed snack SN. The food ingredients used to produce the edible food products may include a first food ingredient and a second food ingredient. The first food ingredient may be seaweed SW, and the second food ingredient may be rice paper RP. A unit product produced by cutting the edible food products may be unit snack SU. Therefore, hereinafter, the configuration and operation of the system 1 for manufacturing edible food products will be described by using the seaweed snack SN instead of the edible food product, a single sheet of seaweed SW instead of a single sheet of a first food ingredient, a seaweed stack WS instead of a first food ingredient stack, a seaweed cassette WC instead of a first food ingredient cassette, a single sheet of rice paper RP instead of a single sheet of a second food ingredient, a paper stack PS instead of a second food ingredient stack, a paper cassette PC instead of a second food ingredient cassette, and the unit snack SU instead of a unit product. However, the edible food product, the first food ingredient, and the second food ingredient are not limited thereto.

The first food ingredient supply apparatus 20 and the second food ingredient supply apparatus 30 may be disposed at a rear end of the system 1 for manufacturing edible food products. The first food ingredient supply apparatus 20 and the second food ingredient supply apparatus 30 may respectively supply the seaweed and the rice paper forward, thereby making a semi-finished product HG in which the seaweed is seated on the rice paper. The semi-finished product HG may be manufactured as the seaweed snack SN by being pressed by the pressing device 50 disposed forward of the first food ingredient supply apparatus 20 and the second food ingredient supply apparatus 30. The first food ingredient supply apparatus 20 may be disposed above the second food ingredient supply apparatus 30 so that the provided seaweed may be easily seated on the rice paper.

The system 1 for manufacturing edible food products according to the embodiment of the present disclosure may include the system frame 10. The system frame 10 is a constituent element serving as a framework provided to fix relative positions of the constituent elements included in the system 1 for manufacturing edible food products. The system frame 10 may be configured by coupling beams extending in the leftward/rightward direction, the forward/rearward direction, and the upward/downward direction.

First Food Ingredient Supply Apparatus 20

Figure 5:
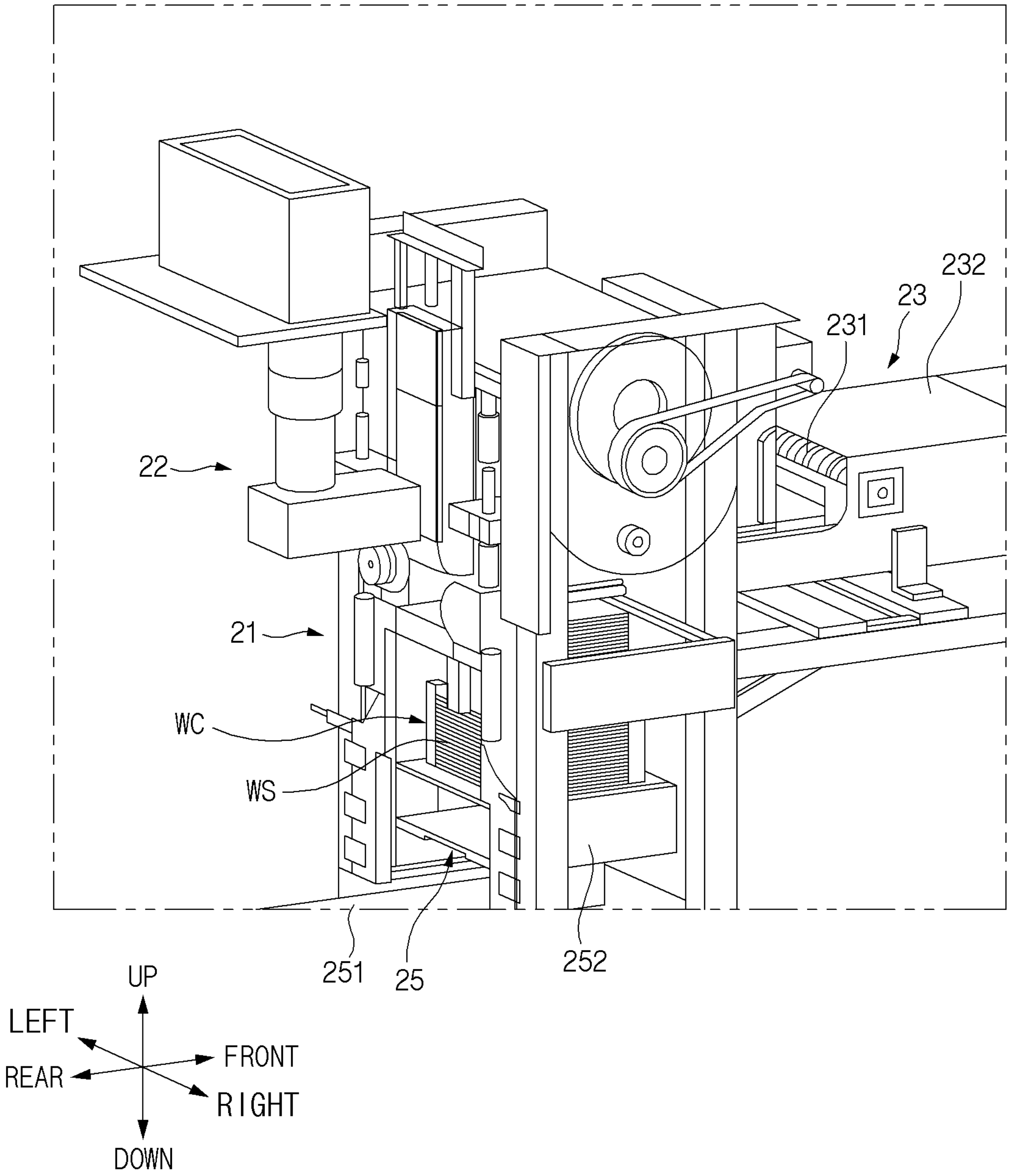
FIG. 5 is an enlarged view of a first food ingredient supply apparatus of the system for manufacturing edible food products according to the embodiment of the present disclosure.
Figure 6:
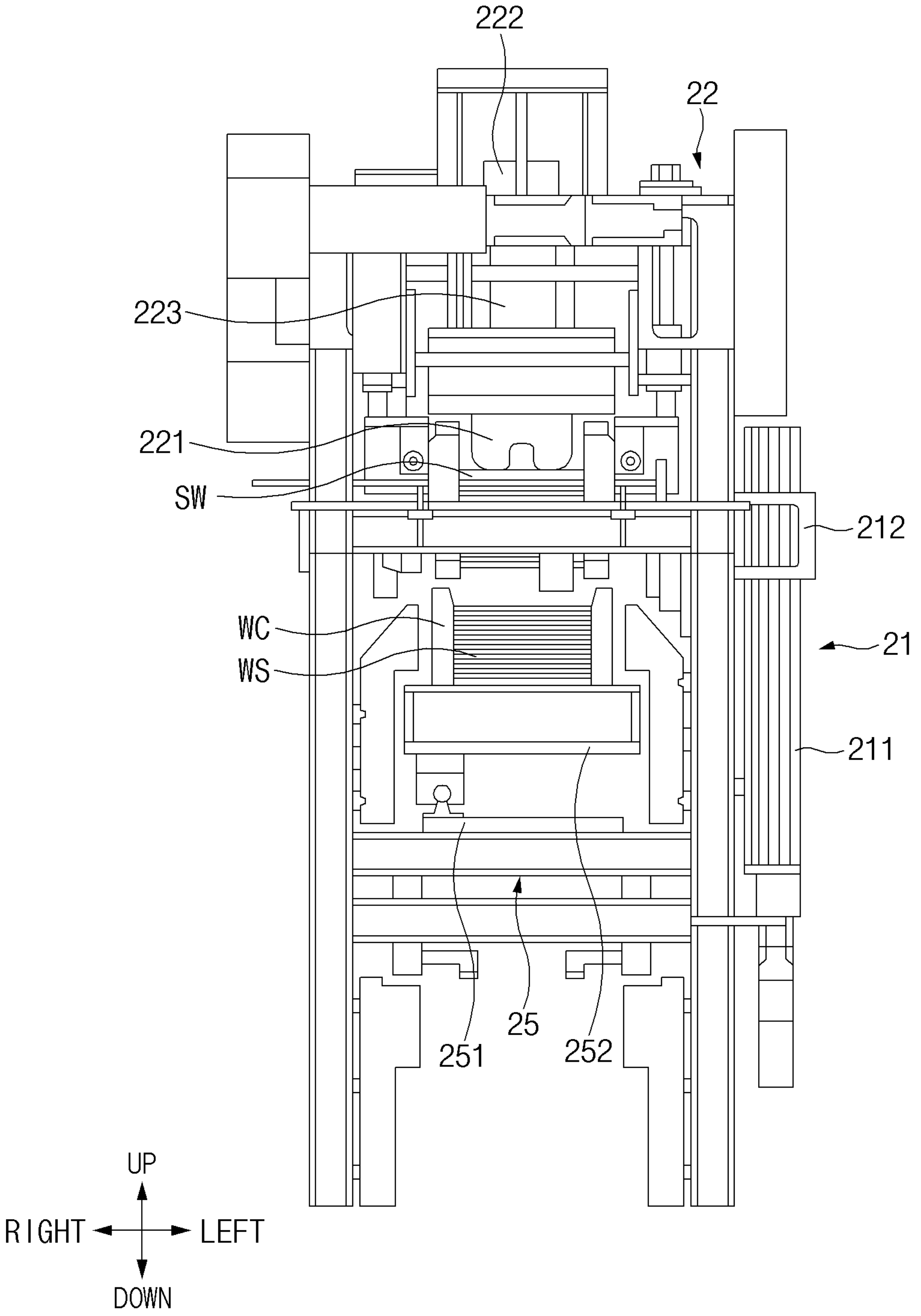
FIG. 6 is a front view of a part of the first food ingredient supply apparatus of the system for manufacturing edible food products according to the embodiment of the present disclosure.
Figure 7:
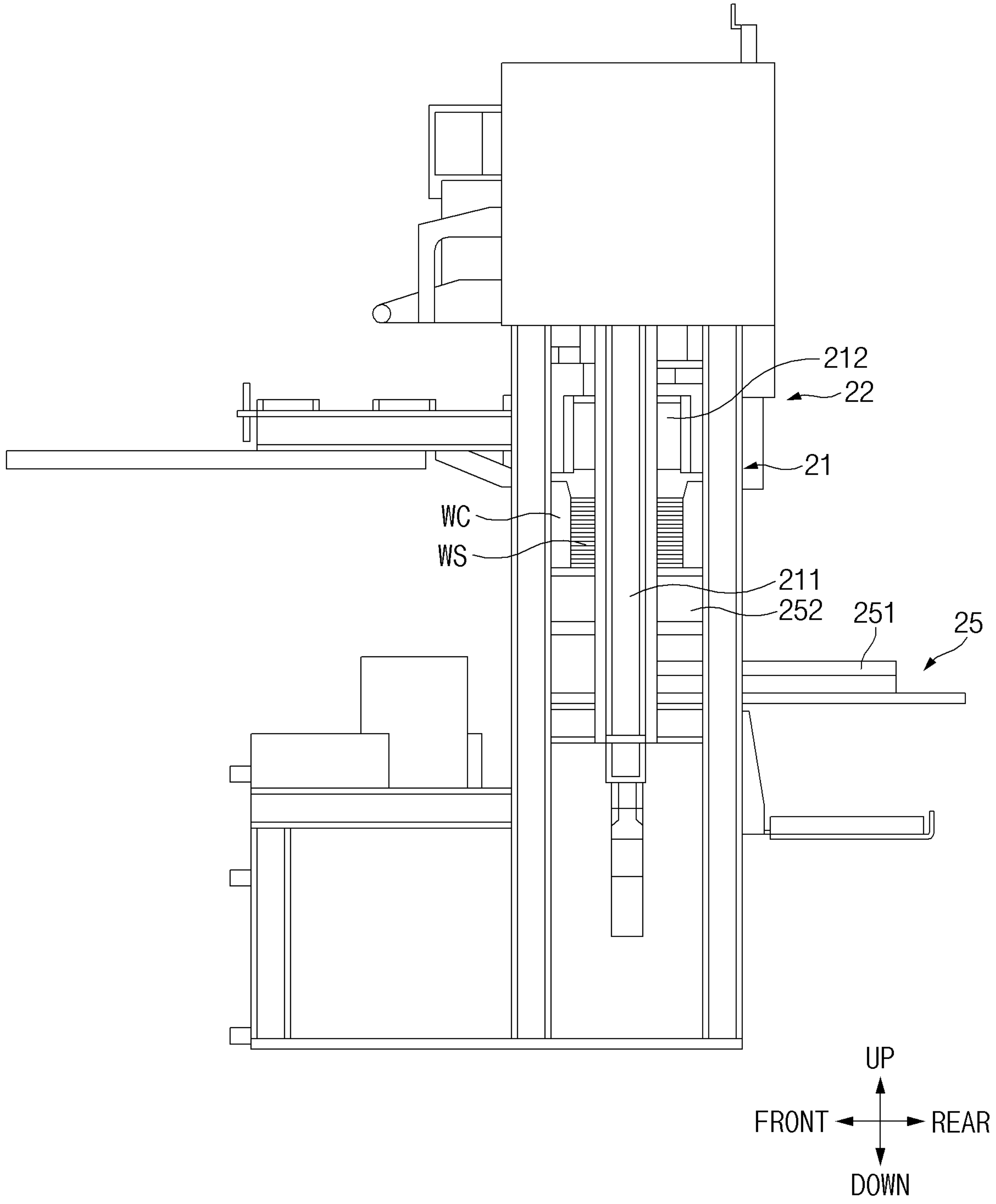
FIG. 7 is a left side view of a part of the first food ingredient supply apparatus of the system for manufacturing edible food products according to the embodiment of the present disclosure.
Figure 8:
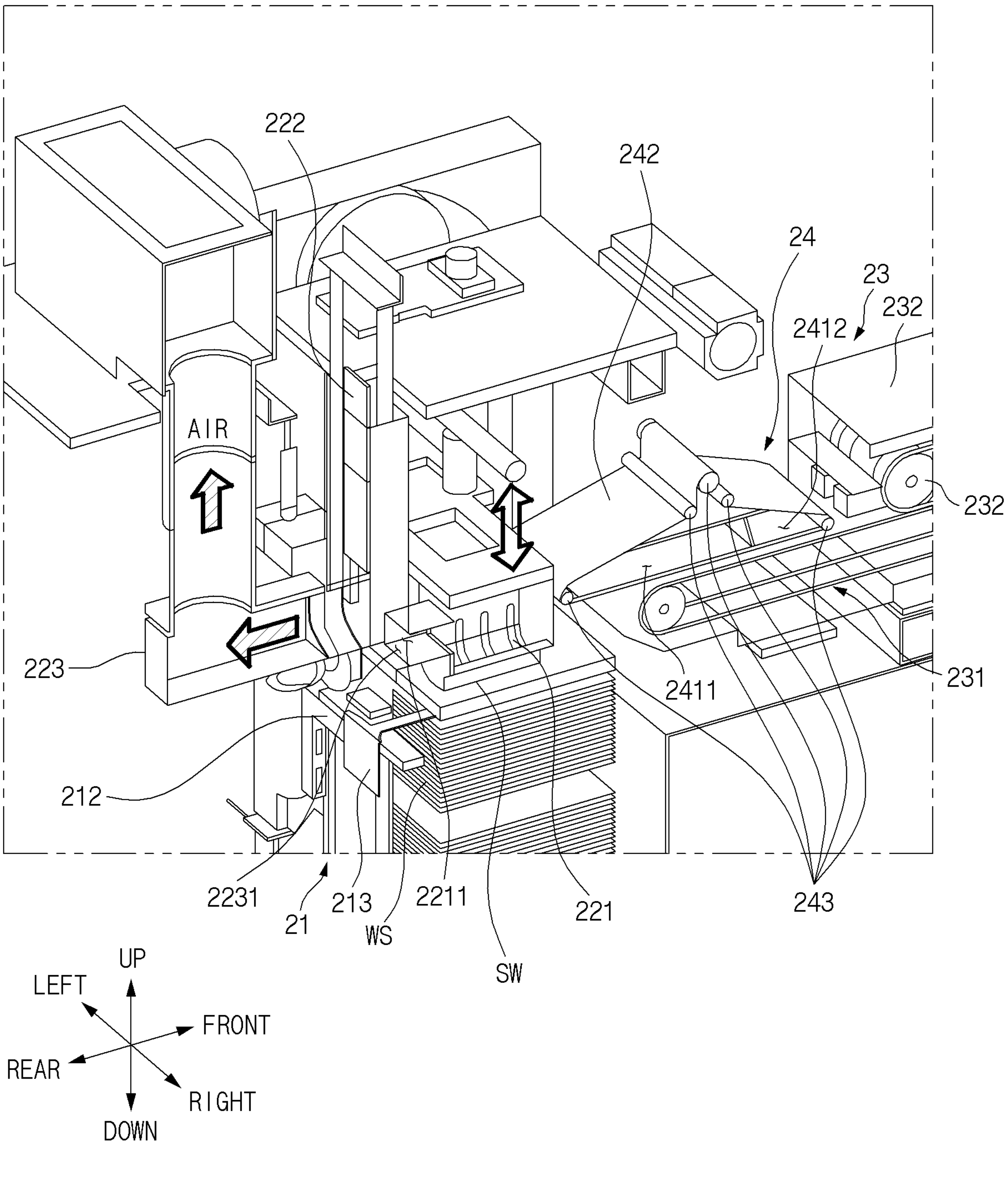
FIG. 8 is a perspective view illustrating that an internal structure of a part of the first food ingredient supply apparatus of the system for manufacturing edible food products according to the embodiment of the present disclosure is exposed.
Figure 9:
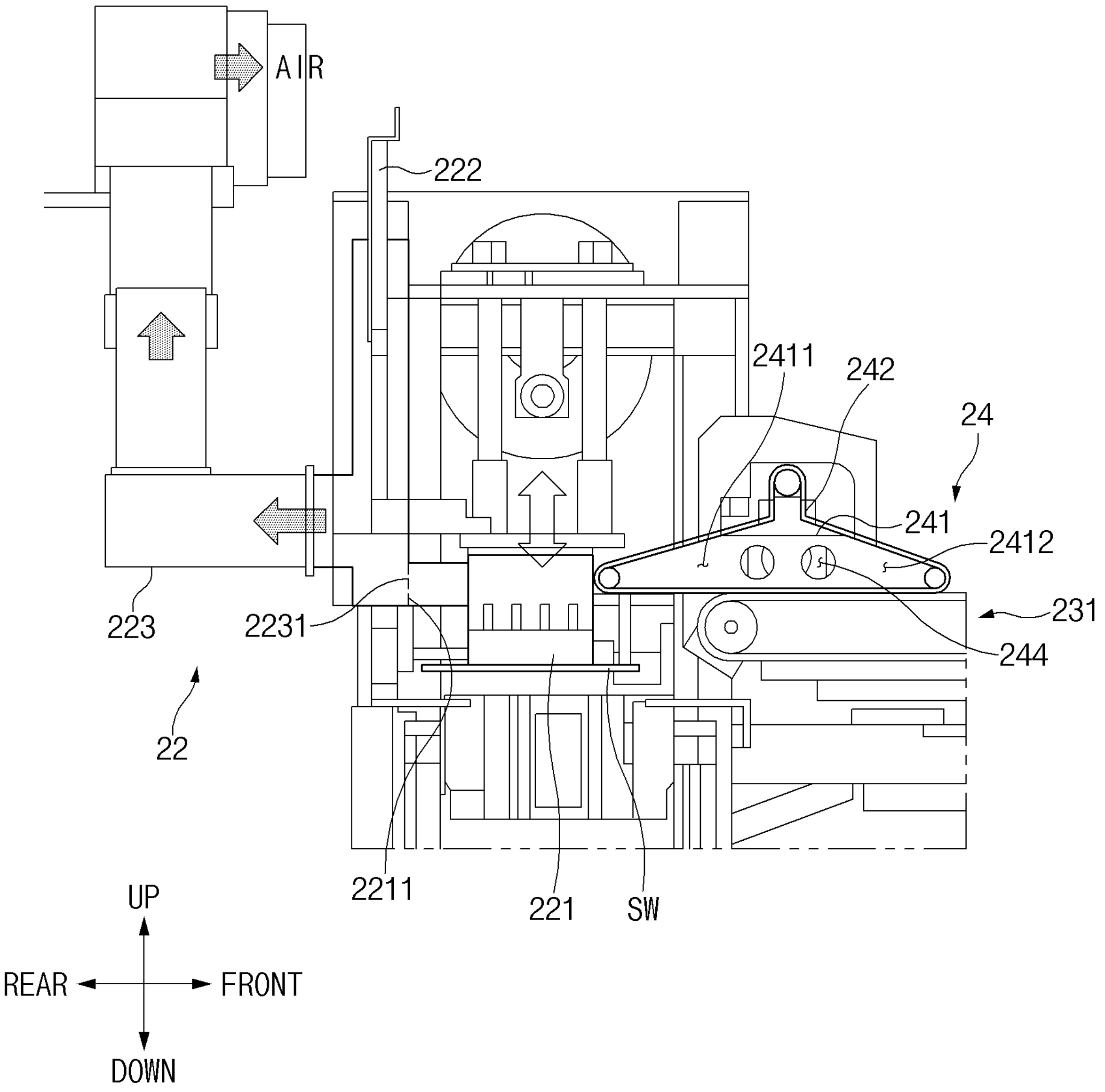
FIG. 9 is a right side view illustrating that an internal structure of a part of the first food ingredient supply apparatus of the system for manufacturing edible food products according to the embodiment of the present disclosure is exposed to the outside.
Figure 10:
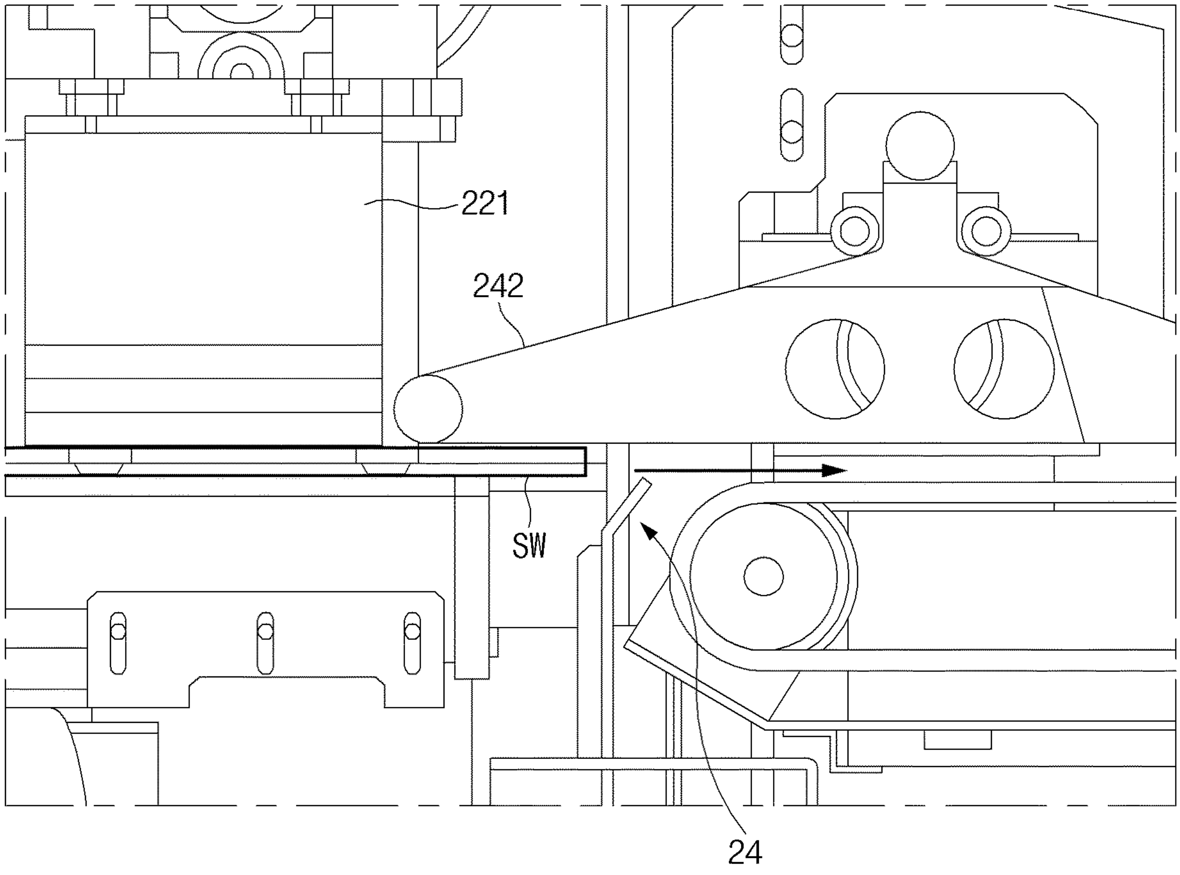
FIG. 10 is a detailed view illustrating a situation in which a suction block in a state in FIG. 9 moves upward and delivers a single sheet of seaweed to a horizontal movement part.

FIG. 5 is an enlarged view of the first food ingredient supply apparatus 20 of the system 1 for manufacturing edible food products according to the embodiment of the present disclosure. FIG. 6 is a front view of a part of the first food ingredient supply apparatus 20 of the system 1 for manufacturing edible food products according to the embodiment of the present disclosure. FIG. 7 is a left side view of a part of the first food ingredient supply apparatus 20 of the system 1 for manufacturing edible food products according to the embodiment of the present disclosure. FIG. 8 is a perspective view illustrating that an internal structure of a part of the first food ingredient supply apparatus 20 of the system 1 for manufacturing edible food products according to the embodiment of the present disclosure is exposed. FIG. 9 is a right side view illustrating that an internal structure of a part of the first food ingredient supply apparatus 20 of the system 1 for manufacturing edible food products according to the embodiment of the present disclosure is exposed to the outside. FIG. 10 is a detailed view illustrating a situation in which a suction block in a state in FIG. 9 moves upward and delivers a single sheet of seaweed to a horizontal movement part.

The first food ingredient supply apparatus 20 is provided to separate the single sheet of seaweed SW from the seaweed stack WS including a plurality of stacked seaweed sheets and supply the single sheet of seaweed SW. The seaweed stack WS may be seated on the seaweed cassette WC and supplied. The seaweed cassette WC is a transport means used to provide the seaweed stack WS. The seaweed cassette WC may be provided in the form of a box opened at an upper side thereof so that the seated seaweed stack WS may be easily treated by a first food ingredient lifting part 21 to be described below without being separated or dropped in a horizontal direction. A first food ingredient lifter hole may be disposed in a bottom plate of the seaweed cassette WC and opened in the upward/downward direction. The first food ingredient lifter hole may have an area smaller than an area of the single sheet of seaweed SW. Therefore, when a first food ingredient lifter 212, which will be described below, moves upward or downward, the first food ingredient lifter 212 may penetrate the first food ingredient lifter hole in the upward/downward direction. However, the seaweed stack WS may not be dropped through the first food ingredient lifter hole at the time of seating the seaweed stack WS on the seaweed cassette WC.

The first food ingredient supply apparatus 20 may include a first food ingredient cassette movement part 25. The first food ingredient cassette movement part 25 is provided to selectively position the seaweed cassette WC at a first lifting position P1 and a second lifting position P2 positioned rearward of the first lifting position P1. The first lifting position P1 is a position at which the first food ingredient lifter 212 may penetrate, in the upward/downward direction, the first food ingredient lifter hole formed in the seaweed cassette WC. Therefore, the first food ingredient cassette movement part 25 may include a first food ingredient cassette rail 251 extending in the forward/rearward direction, and a first food ingredient cassette seating part 252 coupled to the first food ingredient cassette rail 251 so as to be slidable in the forward/rearward direction. The seaweed cassette WC may be seated on the first food ingredient cassette seating part 252 and provided along the first food ingredient cassette rail 251.

The first food ingredient supply apparatus 20 may include the first food ingredient lifting part 21. The first food ingredient lifting part 21 is provided to separate and move the seaweed stack WS upward from the seaweed cassette WC on which the seaweed stack WS including the plurality of stacked seaweed sheets is seated.

The first food ingredient lifting part 21 may include the first food ingredient lifter 212 and a first food ingredient lifting rail 211 extending in the upward/downward direction. The first food ingredient lifter 212 is provided to lift the seaweed stack WS while moving upward from a location below the seaweed stack WS positioned at the first lifting position and penetrating the first food ingredient lifter hole. Therefore, the first food ingredient lifter 212 is coupled to the first food ingredient lifting rail 211 so as to be movable upward or downward. The first food ingredient cassette movement part 25 may move the seaweed cassette WC, which is received from the second lifting position, to the first lifting position. In this case, the first food ingredient lifter 212 is moved downward and disposed at a position lower than the seaweed cassette WC, such that the first food ingredient lifter 212 is positioned below the seaweed cassette WC. After the seaweed cassette WC reaches the first lifting position, the first food ingredient lifter 212 moves upward and penetrates the first food ingredient lifter hole, and an upper surface of the first food ingredient lifter 212 comes into contact with a lower surface of the seaweed stack WS, such that the first food ingredient lifter 212 may lift the seaweed stack WS.

The first food ingredient lifting rail 211 may be disposed at one of left and right sides of the seaweed cassette WC disposed at the first lifting position. The first food ingredient lifter 212 may have a shape extending in the leftward/rightward direction. Therefore, the first food ingredient lifter hole may have a shape for separating lateral surfaces of the seaweed cassette WC based on the leftward/rightward direction from a lateral surface and an edge based on at least one direction among the edges of the bottom plate based on the leftward/rightward direction. This is because the first food ingredient lifter 212 needs to pass through the first food ingredient lifter hole while moving upward or downward.

A first food ingredient separation part 22, which will be described below, may separate the single sheet of seaweed SW from the seaweed stack WS lifted by the first food ingredient lifter 212 and transport the single sheet of seaweed SW. The first food ingredient separation part 22 may suck and transport a seaweed sheet positioned at an uppermost side among the plurality of stacked seaweed sheets included in the seaweed stack WS. Therefore, a height of the seaweed stack WS may decrease as the first food ingredient separation part 22 repeatedly operates. The first food ingredient lifter 212 may move upward to maintain a height of an upper end of the seaweed stack WS from the ground surface even though the first food ingredient separation part 22 operates. Therefore, the first food ingredient separation part 22 may suck and transport the seaweed sheets continuously at the same position.

The first food ingredient lifting part 21 may include a first food ingredient holder 213. In case that the number of seaweed sheets included in the seaweed stack WS lifted by the first food ingredient lifter 212 is a predetermined number or less, a new seaweed stack WS needs to be provided to continuously supply the seaweed. Therefore, the first food ingredient lifter 212 needs to move downward and lift the new seaweed stack WS, and the first food ingredient holder 213 is used in this situation. The first food ingredient holder 213 is provided to support at least some of the plurality of seaweed sheets included in the seaweed stack WS lifted by the first food ingredient lifter 212. The first food ingredient holder 213 may be disposed rearward of the seaweed stack WS lifted by the first food ingredient lifter 212. The first food ingredient holder 213 moves forward and supports the seaweed stack WS by being inserted into a lower side of the seaweed stack WS that is supplying the seaweed sheet to the first food ingredient separation part 22. The first food ingredient lifter 212 may move downward because the seaweed stack WS is not dropped any further even though the first food ingredient lifter 212 is not present. In the state in which the first food ingredient lifter 212 is moved downward, the first food ingredient holder 213 may support the seaweed stack WS while preventing the seaweed stack WS from being dropped, and the first food ingredient separation part 22 may continuously suck and transport the seaweed sheets remaining in the seaweed stack WS.

The first food ingredient lifter 212, which has been moved downward, lifts a new seaweed stack WS while repeating the above-mentioned processes. The first food ingredient lifter 212 may move upward so that an upper end of the new seaweed stack WS is moved upward to a height adjacent to a lower side of the first food ingredient holder 213. Thereafter, the first food ingredient holder 213 may separate from the exiting seaweed stack WS. In case that the first food ingredient holder 213 is disposed rearward of the seaweed stack WS, the first food ingredient holder 213 may move rearward to separate from the seaweed stack WS. As the first food ingredient holder 213 separates, the existing seaweed stack WS may be seated on the new seaweed stack WS, and the first food ingredient lifter 212 may support the new seaweed stack WS on which the existing seaweed stack WS is seated.

The first food ingredient supply apparatus 20 may include the first food ingredient separation part 22. The first food ingredient separation part 22 is provided to grip and move the single sheet of seaweed SW from the seaweed stack WS. The first food ingredient separation part 22 may move upward or downward. The first food ingredient separation part 22 may suck the single sheet of seaweed SW at the upper end of the seaweed stack WS and move the single sheet of seaweed SW upward.

The first food ingredient separation part 22 may include a suction block 221. The suction block 221 may approach the single sheet of seaweed SW positioned at the upper end of the seaweed stack WS, suck an upper surface of the single sheet of seaweed SW, and move upward or downward. The suction block 221 may move downward and approach the single sheet of seaweed SW. The suction block 221 may suck the single sheet of seaweed SW while coming into direct contact with the upper end of the seaweed stack WS. However, the suction block 221 may suck the single sheet of seaweed SW as the single sheet of seaweed SW is moved upward by suction air in a state in which the suction block 221 is positioned close to the upper end of the seaweed stack WS.

The suction block 221 has a structure in the form of a hollow box and has a suction hole formed at a lower side of the suction block 221, such that the suction block 221 may suck the seaweed sheet by sucking air through the hole. The hole may be provided in the form of a long hole extending in the leftward/rightward direction. The suction block 221 may have a groove extending in the forward/rearward direction and recessed upward from a lower surface of the suction block 221, and legs of the suction block 221 positioned at left and right sides of the groove may come into contact with the single sheet of seaweed SW.

The first food ingredient separation part 22 may include a passageway member 223. Like a pipe, the passageway member 223 may have an internal space in which air may flow. One end of the passageway member 223 may receive negative pressure by being connected to a first food ingredient lifting blower 26 configured to generate negative pressure, and the other end of the passageway member 223 may communicate with the suction block 221. The passageway member 223 may or may not communicate with the suction block 221 depending on a motion of the suction block 221. Therefore, in case that the passageway member 223 communicates with the suction block 221, the passageway member 223 may serve to provide the suction block 221 with the negative pressure used by the suction block 221 to suck the single sheet of seaweed SW. In case that the passageway member 223 does not communicate with the suction block 221, the supply of the negative pressure to the suction block 221 may be cut off.

The passageway member 223 and the suction block 221 may be connected to each other, and the suction block 221 may move in the upward/downward direction relative to the passageway member 223. In FIG. 9, a part of the passageway member 223 and the suction block 221 are indicated by the bold lines, and a boundary between the two members is indicated by the broken line. The suction block 221 and the passageway member 223 communicate with each other in the state illustrated in FIG. 9, and the suction block 221 moves upward in the state illustrated in FIG. 9, such that the state illustrated in FIG. 10 is made, and a rear end of the suction block 221 may come into contact with a front surface of the passageway member 223 that is indicated by the bold line likewise.

A hole through which the suction block 221 and the passageway member 223 communicate with each other may be closed as the suction block 221 moves upward, and the hole may be opened as the suction block 221 moves downward. The suction block 221 may have a block negative pressure provision opening 2211 provided at the rear end thereof, and the passageway member 223 may have a passageway negative pressure provision opening 2231 provided at a front end thereof.

In case that the block negative pressure provision opening 2211 and the passageway negative pressure provision opening 2231 communicate with each other, negative pressure is transferred from the passageway member 223 to the suction block 221. As illustrated in FIG. 9, when the suction block 221 is maximally move downward, a region in which the block negative pressure provision opening 2211 and the passageway negative pressure provision opening 2231 overlap each other in the forward/rearward direction is largest, and a size of the hole through which the suction block 221 and the passageway member 223 communicate with each other may be largest. In this situation, the highest negative pressure is provided to the suction block 221, and the suction block 221 may smoothly suck the single sheet of seaweed SW.

When an area in which the block negative pressure provision opening 2211 and the passageway negative pressure provision opening 2231 communicate with each other decreases, a magnitude of the negative pressure provided to the suction block 221 decreases. As the suction block 221 moves upward, the block negative pressure provision opening 2211 is slowly covered by a front surface of the passageway member 223, and a region in which the block negative pressure provision opening 2211 and the passageway negative pressure provision opening 2231 overlap each other decreases. As illustrated in FIG. 10, when the suction block 221 is maximally moved upward, the region in which the block negative pressure provision opening 2211 and the passageway negative pressure provision opening 2231 overlap each other in the forward/rearward direction is smallest or absent, and the size of the hole through which the suction block 221 and the vacuum passageway member communicate with each other may be smallest. In this situation, the lowest negative pressure is provided to the suction block 221, and the suction power is not applied to the single sheet of seaweed SW. However, because the single sheet of seaweed SW sucked and moved upward by the suction block 221 is sucked and transferred by a horizontal movement part 24 to be described below, the single sheet of seaweed SW may not be dropped and returned back to the seaweed stack WS.

The first food ingredient lifting blower 26 may continuously maintain an operating state in the situation in which the suction block 221 repeatedly provides or cuts off negative pressure while moving upward or downward. Therefore, the system 1 for manufacturing edible food products of the present disclosure may control intensity of negative pressure applied to the suction block 221 by using the mechanical configuration in the state in which the operating state of the first food ingredient lifting blower 26 is constantly maintained, instead of controlling intensity of negative pressure applied to the suction block 221 by controlling intake intensity of the first food ingredient lifting blower 26 or operations of operating/stopping the first food ingredient lifting blower 26.

In case that a process of controlling the first food ingredient lifting blower 26 and a process of controlling the upward/downward movement of the suction block 221 are separately controlled, the supply of the seaweed cannot be smoothly performed because of a time difference between the two control processes, and the first food ingredient supply apparatus 20 needs to be slowly controlled to accurately supply the seaweed. In contrast, in case that the control process is performed by the above-mentioned mechanical configuration of the present disclosure, the process of controlling the first food ingredient lifting blower 26 and the process of controlling the upward/downward movement of the suction block 221 are independently performed. Therefore, there occurs no error or delay caused by a problem with synchronization, and the single sheet of seaweed SW may be provided to a seaweed supply part at a comparatively high speed. In the embodiment of the present disclosure, the blowers included in the system 1 for manufacturing edible food products may each include a pump and an impeller and suck air. However, the configuration of the blower is not limited thereto.

The first food ingredient separation part 22 may include a gate valve 222. The gate valve 222 may be disposed in the passageway member 223 and adjust an opening degree of a part of the passageway member 223. Therefore, it is possible to adjust a flow rate of air sucked by the suction block 221 through the passageway member 223.

The first food ingredient separation part 22 may include a particle removing filter. Because the suction block 221 sucks air to suck the seaweed, particles such as seaweed debris may be collected in the passageway member 223. The particle removing filter may be disposed in the passageway member 223 and filter out the particles to prevent the particles from moving into the first food ingredient lifting blower 26 and causing a breakdown. The particle removing filter may be a filter configured to use static electricity or a filter having a net having fine through-holes and configured to filter out particles each having a larger size than the through-hole. However, the type of particle removing filter is not limited thereto.

The first food ingredient supply apparatus 20 may include the horizontal movement part 24. The horizontal movement part 24 is provided to transfer forward the single sheet of seaweed SW moved upward by the suction block 221 of the first food ingredient separation part 22. The horizontal movement part 24 may be a suction conveyor. The horizontal movement part 24 is disposed so that a lower surface thereof comes into contact with the upper surface of the single sheet of seaweed SW moved upward by the first food ingredient separation part 22. The horizontal movement part 24 is provided to transfer forward the single sheet of seaweed SW that is in contact with the horizontal movement part 24. Because the horizontal movement part 24 may be the suction conveyor, the horizontal movement part 24 may simultaneously suck and transfer the single sheet of seaweed SW. Therefore, the lower surface of the horizontal movement part 24 comes into contact with the upper surface of the single sheet of seaweed SW, such that the single sheet of seaweed SW may be supported by the horizontal movement part 24 without being dropped downward even though there is no constituent element for supporting the single sheet of seaweed SW.

The horizontal movement part 24 may not come into contact with the entire upper surface of the single sheet of seaweed SW. This is because the single sheet of seaweed SW is delivered to the horizontal movement part 24 in the state in which the suction block 221 is in contact with the upper surface of the single sheet of seaweed SW. Therefore, the suction block 221 may come into contact with one portion of the single sheet of seaweed SW, and the horizontal movement part 24 may also come into contact with another portion of the single sheet of seaweed SW. As illustrated, the suction block 221 may come into contact with a central portion of the single sheet of seaweed SW, and the horizontal movement part 24 may come into contact with a front region of the single sheet of seaweed SW. Particularly, to stably transfer the single sheet of seaweed SW by the horizontal movement part 24, a partial region of the upper surface of the single sheet of seaweed SW, which comes into contact with the horizontal movement part 24, may have a length of ⅓ or more of a length of the single sheet of seaweed SW in the forward/rearward direction.

The horizontal movement part 24 may have a tapered shape having a length that decreases upward in the forward/rearward direction when viewed in the leftward/rightward direction. However, the lower surface of the horizontal movement part 24 may be formed horizontally, such that the single sheet of seaweed SW may be stably transferred forward.

The horizontal movement part 24, which may be a suction conveyor, may include a horizontal movement body 241, a suction belt 242, and suction rollers 243. The horizontal movement body 241 is a part that receives negative pressure and has a plurality of body holes and body provision holes 244. The body hole may be formed in a lower surface of the horizontal movement body 241. The body provision holes 244 may be formed at left and right sides of the horizontal movement body 241 and receive negative pressure by being connected to a horizontal movement blower 27. The suction belt 242 may be wound around peripheral surfaces of the horizontal movement body 241 formed in the forward/rearward direction and the upward/downward direction and come into contact with the single sheet of seaweed SW. The suction belt 242 may have a plurality of intake holes. The intake holes may communicate with the plurality of body holes so that suction power capable of sucking the single sheet of seaweed SW is generated. Therefore, the single sheet of seaweed SW may be sucked by the horizontal movement part 24 by air sucked through the intake holes and the body holes. When the suction rollers 243 rotate, the suction belt 242 rotates about the axis defined in the leftward/rightward direction along the periphery of the horizontal movement body 241. The suction belt 242 may be rotated by the suction rollers 243 and transfer the sucked single sheet of seaweed SW forward.

The conveyor included in the system 1 for manufacturing edible food products of the present disclosure or the roller included in the conveyor may be operated by being connected to a motor that generates rotational driving power by using received electric power. However, another driving source such as an actuator may also be used instead of the motor.

The internal space of the horizontal movement body 241 may be divided into a negative pressure space 2411 and a non-negative pressure space 2412. The negative pressure space 2411 may communicate with the outside through the body provision hole 244 and the body hole, such that the negative pressure space 2411 may receive negative pressure and communicate with the outside through the body hole. No negative pressure is provided to the non-negative pressure space 2412.

The plurality of intake holes may each be provided in the form of a long hole extending in the forward/rearward direction when viewed from below to above. The plurality of intake holes may be alternately disposed in the forward/rearward direction in a zigzag manner in the leftward/rightward direction when viewed from below to above. Therefore, it is possible to prevent the single sheet of seaweed SW from being sucked only at least partially and damaged, and it is possible to suck a maximally wide area of the single sheet of seaweed SW.

The first food ingredient supply apparatus 20 may include a first food ingredient transfer part 23. The first food ingredient transfer part 23 may be provided to transfer the single sheet of seaweed SW, which has been separated by the first food ingredient separation part 22 and delivered forward by the horizontal movement part 24, to the pressing device 50. The first food ingredient transfer part 23 may include a plurality of first food ingredient transfer conveyors 231. The first food ingredient transfer conveyors 231 may transfer the seaweed forward in a state in which upper surfaces of the first food ingredient transfer conveyors 231 support a lower surface of the single sheet of seaweed SW transferred by the horizontal movement part 24. Therefore, a rear end of the first food ingredient transfer part 23 may partially overlap the horizontal movement part 24 in the forward/rearward direction to stably transfer the seaweed.

The first food ingredient transfer conveyors 231 are configured doubly in the upward/downward direction, such that the single sheet of seaweed SW may be disposed between the first food ingredient transfer conveyors 231, and the first food ingredient transfer conveyors 231 may come into contact with the upper and lower surfaces of the single sheet of seaweed SW and transfer the single sheet of seaweed SW.

The first food ingredient transfer part 23 may include a first food ingredient transfer housing 232 configured to surround an interior thereof so that the interior is spatially separated from the outside. The seaweed is sensitive to humidity. When humidity is high, the seaweed is soggy, which may make it difficult to process the seaweed. However, because water may be supplied to the rice paper in the second food ingredient supply apparatus 30 to be described below, it is necessary to prevent the single sheet of seaweed SW, which is transferred by the first food ingredient transfer part 23, from becoming soggy because of the supply of water.

The first food ingredient transfer part 23 may include a portion inclined downward in the forward direction. The inclined portion may prevent the single sheet of seaweed SW from slipping from the first food ingredient transfer conveyor 231 by its own weight when the single sheet of seaweed SW is transferred. The single sheet of seaweed SW may be rotated together with a plurality of seaweed sheet position fixing bars so that the single sheet of seaweed SW is properly seated by being synchronized with a single sheet of rice paper RP to be described below. The plurality of seaweed sheet position fixing bars is disposed on the first food ingredient transfer conveyors 231 and spaced apart from one another in the forward/rearward direction. The plurality of seaweed sheet position fixing bars further protrudes upward than an upper surface of the first food ingredient transfer conveyor 231. The single sheet of seaweed SW may be positioned between the adjacent seaweed position fixing bars, and the seaweed position fixing bars may restrict the movement of the single sheet of seaweed SW in the forward/rearward direction.

Second Food Ingredient Supply Apparatus 30

Figure 11:
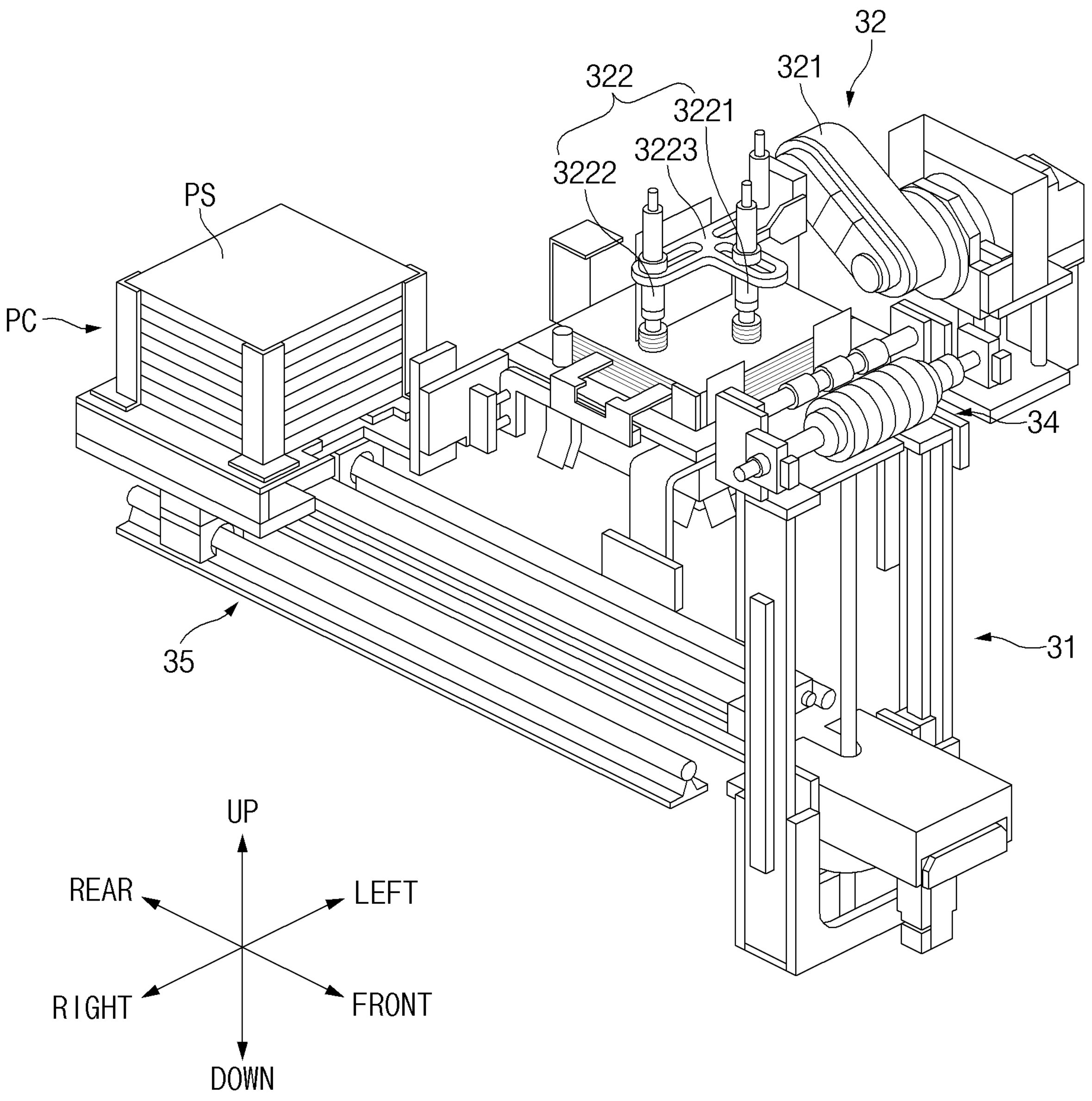
FIG. 11 is a perspective view of a part of a second food ingredient supply apparatus of the system for manufacturing edible food products according to the embodiment of the present disclosure.
Figure 12:
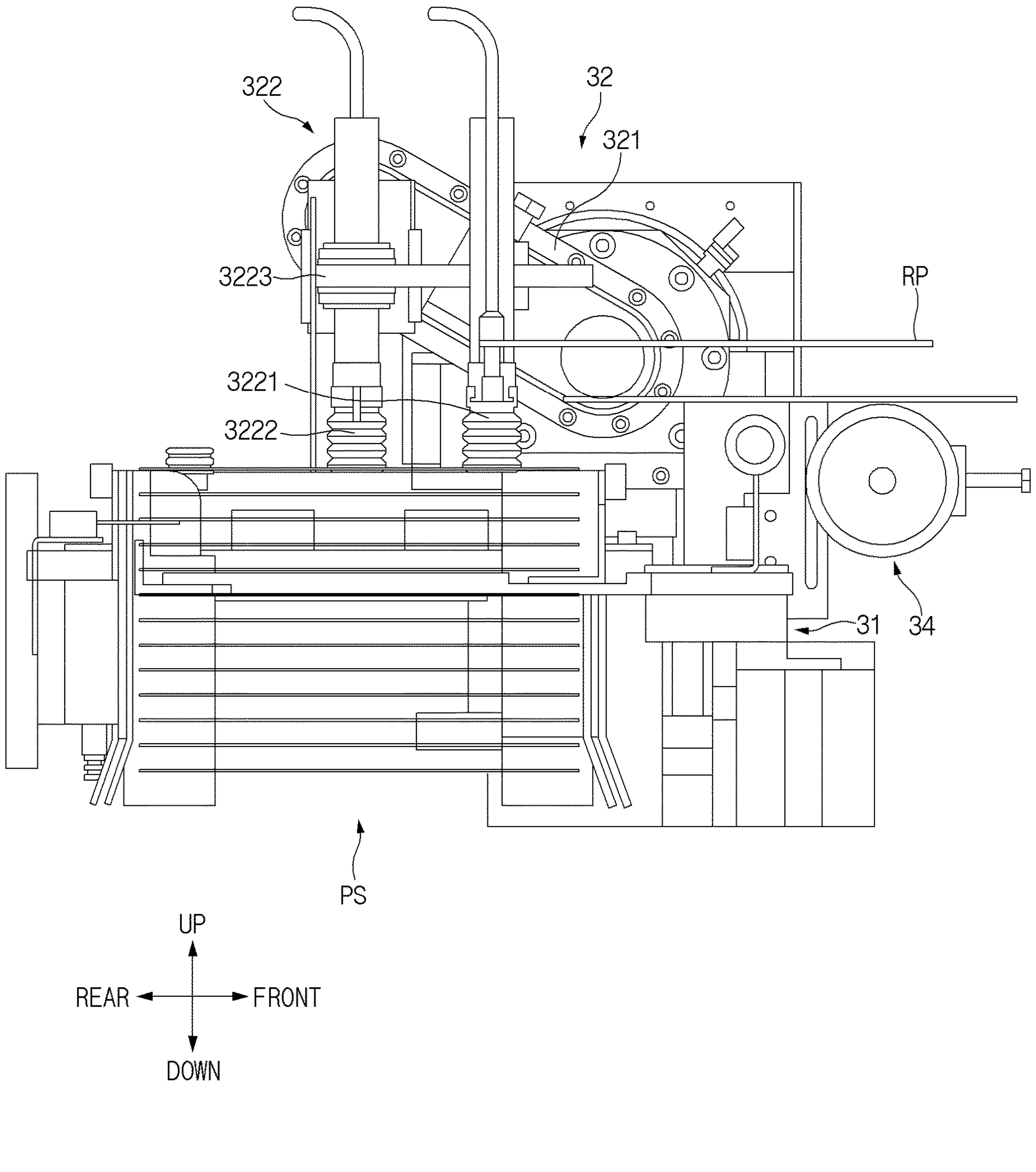
FIG. 12 is a right side view of a part of the second food ingredient supply apparatus of the system for manufacturing edible food products according to the embodiment of the present disclosure.
Figure 13:
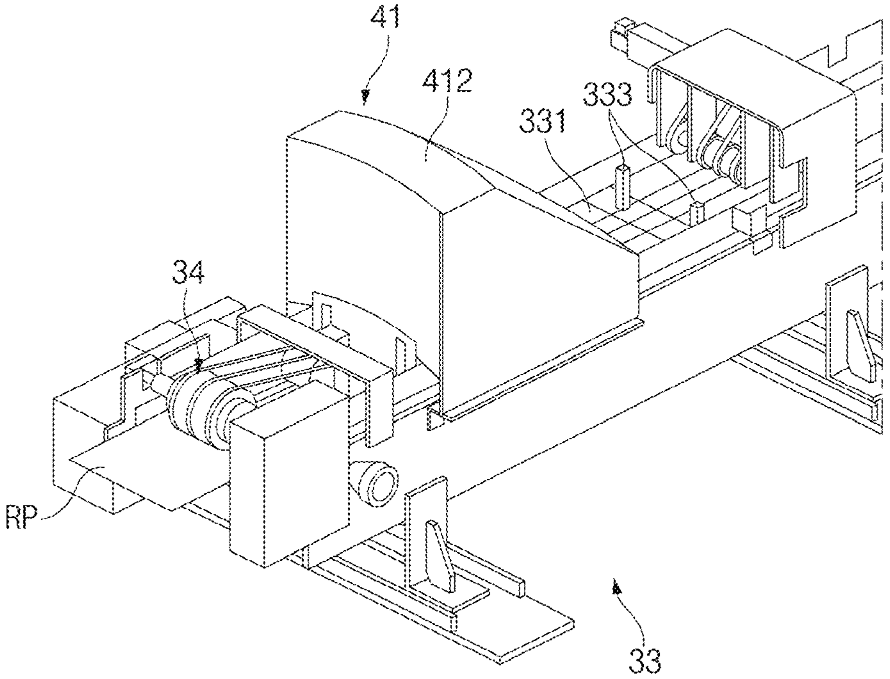
FIG. 13 is a perspective view illustrating a second food ingredient conveyor and a joining agent spray device of the system for manufacturing edible food products according to the embodiment of the present disclosure.
Figure 14:
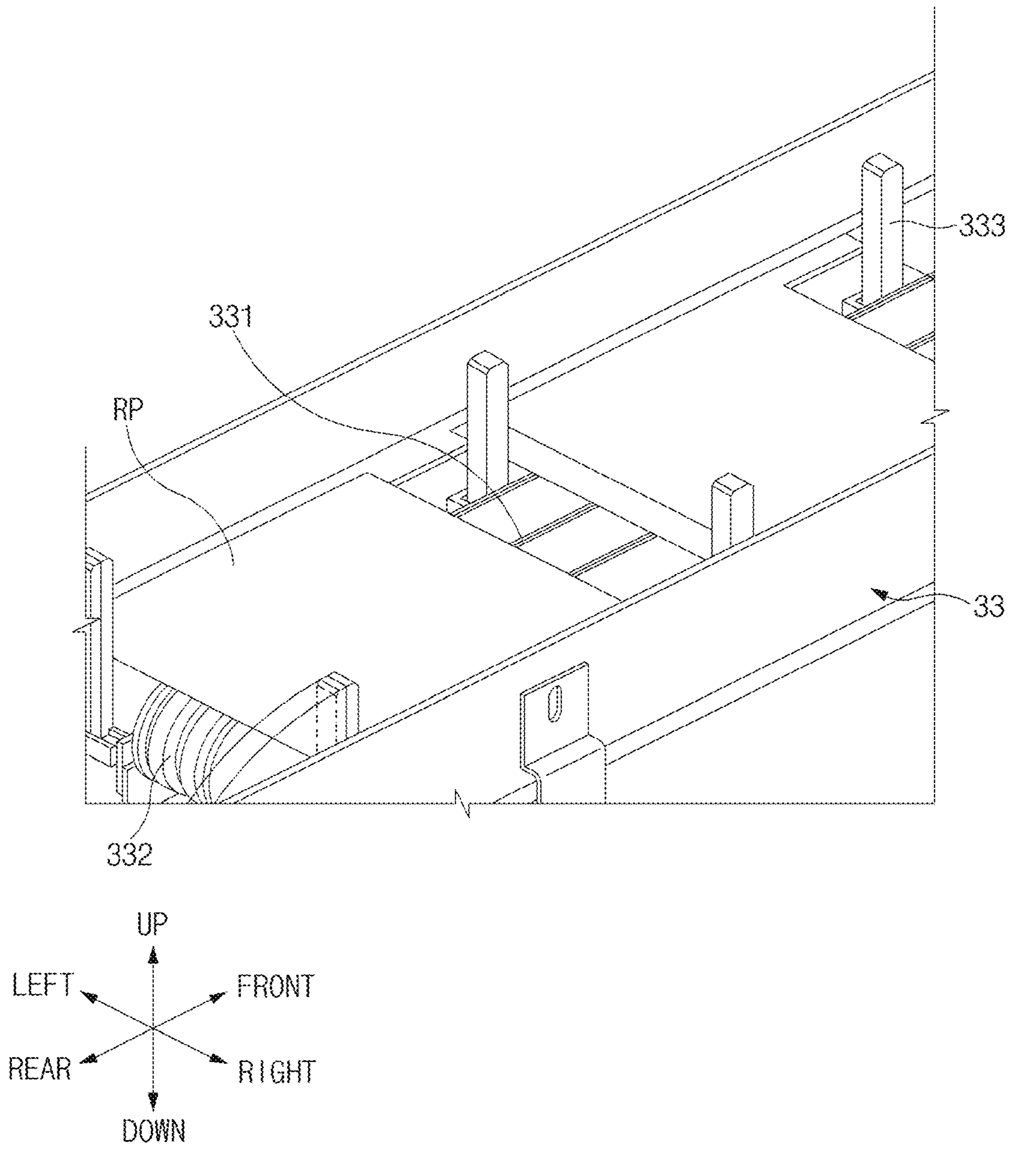
FIG. 14 is a perspective view illustrating the second food ingredient conveyor of the system for manufacturing edible food products according to the embodiment of the present disclosure.

FIG. 11 is a perspective view of a part of the second food ingredient supply apparatus 30 of the system 1 for manufacturing edible food products according to the embodiment of the present disclosure. FIG. 12 is a right side view of a part of the second food ingredient supply apparatus 30 of the system 1 for manufacturing edible food products according to the embodiment of the present disclosure. FIG. 13 is a perspective view illustrating a second food ingredient conveyor and the joining agent spray device 41 of the system 1 for manufacturing edible food products according to the embodiment of the present disclosure. FIG. 14 is a perspective view illustrating the second food ingredient conveyor of the system 1 for manufacturing edible food products according to the embodiment of the present disclosure.

The second food ingredient supply apparatus 30 is provided separate the single sheet of rice paper RP from the paper stack PS including a plurality of stacked rice paper sheets and supply the single sheet of rice paper RP. The paper stack PS may be seated on the paper cassette PC and supplied. Because the description of the paper cassette PC is identical to the description of the seaweed cassette WC, except that the seaweed is changed to the rice paper, the description of the paper cassette PC is replaced with the description of the seaweed cassette WC.

The second food ingredient supply apparatus 30 may include a second food ingredient cassette movement part 35 and a second food ingredient lifting part 31. Because the description of the second food ingredient cassette movement part 35 and the second food ingredient lifting part 31 is identical to the description of the first food ingredient cassette movement part 25 and the first food ingredient lifting part 21, except that the seaweed is changed to the rice paper, the description of the second food ingredient cassette movement part 35 and the second food ingredient lifting part 31 is replaced with the description of the first food ingredient cassette movement part 25 and the first food ingredient lifting part 21.

The second food ingredient supply apparatus 30 may include a second food ingredient separation part 32. The second food ingredient separation part 32 is provided to grip and move forward the single sheet of rice paper RP from the paper stack PS. The second food ingredient separation part 32 may include a second food ingredient holding member 322 configured to grip the single sheet of rice paper RP, and a swing arm 321 configured to move the single sheet of rice paper RP sucked by the second food ingredient holding member 322.

The second food ingredient holding member 322 is provided to grip, by suction, a single sheet of rice paper RP positioned at an uppermost side among the plurality of rice paper sheets included in the paper stack PS. The second food ingredient holding member 322 may be connected to a paper gripping blower and grip, by suction, the rice paper by receiving negative pressure. The negative pressure is supplied when the second food ingredient holding member 322 approaches the paper stack PS, and the negative pressure is eliminated when the second food ingredient holding member 322 approaches a second food ingredient transfer part 33, such that the second food ingredient holding member 322 may seat the rice paper on the second food ingredient transfer part 33 and separate from the rice paper.

The second food ingredient holding member 322 may include a plurality of second food ingredient suction heads 3221 and 3222. In the embodiment of the present disclosure, a configuration is described in which a total of three second food ingredient suction heads 3221 and 3222 are disposed. The number of second food ingredient suction heads and the arrangement shape of the second food ingredient suction heads are not limited thereto. The number of second food ingredient suction heads and the arrangement shape of the second food ingredient suction heads may be variously modified to improve sizes and properties of supplied raw materials, properties of materials, and efficiency of combination with facilities disposed at the rear end. Among the three second food ingredient suction heads 3221 and 3222, two second food ingredient suction heads 3222 may be disposed to be spaced apart from each other in the leftward/rightward direction, and one second food ingredient suction heads 3221 may be disposed forward of the two second food ingredient suction heads 3222. Therefore, the second food ingredient holding member 322 may have a structure in which the three second food ingredient suction heads 3221 and 3222 are respectively disposed on isosceles triangular vertices when viewed from above. The second food ingredient suction heads 3221 and 3222 may be slidably and fixedly coupled to a second food ingredient gripping frame 3223 so that intervals between the second food ingredient suction heads 3221 and 3222 may be adjusted. Because the second food ingredient supply apparatus 30 has the above-mentioned arrangement of the second food ingredient suction heads 3221 and 3222, the second food ingredient supply apparatus 30 may stably grip and transfer the rice paper even when the single sheet of rice paper RP is curved at room temperature.

The second food ingredient holding member 322 is disposed at a distal end of the swing arm 321. The swing arm 321 may rotate about the axis defined in the leftward/rightward direction, thereby changing a position of the second food ingredient holding member 322 based on the forward/rearward direction. Based on FIG. 12, the swing arm 321 may move the rice paper from a left-lower side toward a right-upper side by rotating clockwise. In addition, after the swing arm 321 delivers the rice paper to the second food ingredient transfer part 33, the swing arm 321 may rotate counterclockwise based on FIG. 12 to suck the rice paper again. That is, the swing arm 321 may reciprocatively rotate.

The swing arm 321 may be coupled to the second food ingredient holding member 322 so that the direction in which the second food ingredient holding member 322 is arranged is constant at a position at which the single sheet of rice paper RP is sucked and a position at which the single sheet of rice paper RP is placed on the second food ingredient transfer part 33 to be described below. Therefore, the rice paper may be horizontally supplied to the second food ingredient separation part 32 and horizontally separated from the second food ingredient separation part 32.

The second food ingredient supply apparatus 30 may include the second food ingredient transfer part 33. The second food ingredient transfer part 33 is provided to transfer the single sheet of rice paper RP, which has been delivered by the second food ingredient separation part 32, to the pressing device 50.

The second food ingredient transfer part 33 may include second food ingredient holding rollers 34. The second food ingredient holding rollers 34 are rollers that may be stopped or rotated to deliver the rice paper to a second food ingredient conveyor, which will be described below, at an appropriate time without immediately delivering and transferring the single sheet of rice paper RP to the second food ingredient conveyor when the single sheet of rice paper RP is delivered by the second food ingredient separation part 32. The second food ingredient holding rollers 34 may be configured in a form in which two rollers, which may rotate about the axis defined in the leftward/rightward direction, are spaced apart from each other in the upward/downward direction, and the two rollers may stop operating to hold the rice paper or may rotate to push the rice paper forward when the rice paper moves between the two rollers. The single sheet of rice paper RP pushed by the second food ingredient holding rollers 34 may be delivered to the second food ingredient conveyor.

The second food ingredient transfer part 33 may include the second food ingredient conveyor. The second food ingredient conveyor is provided to transfer the single sheet of rice paper RP forward when the single sheet of rice paper RP is delivered by the second food ingredient separation part 32, unloaded forward by the second food ingredient holding roller 34, and seated on an upper surface of the second food ingredient conveyor.

The second food ingredient conveyor may include a second food ingredient belt 331, and a second food ingredient roller 332 configured to rotate the second food ingredient belt 331. The second food ingredient belt 331 may be formed to come into contact with a part of the rice paper without coming into contact with another part of the rice paper. As illustrated, a plurality of stands protrudes outward from the second food ingredient belt 331 and each has a very small thickness in the leftward/rightward direction. The plurality of stands is disposed to be spaced apart from one another in the leftward/rightward direction. The second food ingredient belt 331 may transfer the rice paper forward in a state in which the rice paper is seated on the plurality of stands. Therefore, the second food ingredient belt 331 may transfer the rice paper while preventing deformation of the rice paper caused by heat by minimizing a contact area with the rice paper.

The second food ingredient transfer part 33 may include second food ingredient position fixing bars 333. A plurality of second food ingredient position fixing bars 333 may be disposed on the second food ingredient conveyor and spaced apart from one another in the forward/rearward direction. The plurality of second food ingredient position fixing bars 333 may protrude outward in the forward/rearward direction or the upward/downward direction from the second food ingredient conveyor. An interval between the two adjacent second food ingredient position fixing bars 333 may be larger than a length of the single sheet of rice paper RP in the forward/rearward direction. Therefore, the single sheet of rice paper RP may be positioned between the adjacent second food ingredient position fixing bars 333, and the second food ingredient position fixing bars 333 may restrict the movement of the single sheet of rice paper RP in the forward/rearward direction. The second food ingredient holding roller 34 may hold the rice paper in a stopped state so that the single sheet of rice paper RP may be supplied between the adjacent second food ingredient position fixing bars 333, and then the second food ingredient holding roller 34 may rotate to transfer the rice paper forward.

Joining Agent Spray Device 41

The system 1 for manufacturing edible food products according to the embodiment of the present disclosure may include the joining agent spray device 41. The joining agent spray device 41 is provided adjacent to the second food ingredient transfer part 33 to spray a joining agent onto the upper surface of the single sheet of rice paper RP transferred by the second food ingredient transfer part 33. The second food ingredient conveyor may be disposed to penetrate the joining agent spray device 41. The joining agent spray device 41 may include a spray nozzle 411. The spray nozzle 411 may be connected to a joining agent supply part and spray the joining agent onto the upper surface of the rice paper transferred by the second food ingredient conveyor. The joining agent may be one of water, salt, starch, a sugar solution, and a flavoring agent. The flavoring agent is provided to add taste, and any flavoring agent, which is allowed for food, may be used. The flavoring agent may be, but not limited to, one of lemon concentrate, ginger concentrate, plum concentrate, green tea powder, cinnamon syrup, shrimp extract, katsuobushi extract, herb extract, and taste seasoning. The spray nozzle 411 may be provided as a plurality of spray nozzles 411.

The joining agent spray device 41 may include a spray cover 412. The spray cover 412 is configured to cover the second food ingredient conveyor from above. The spray cover 412 may allow the joining agent sprayed from the spray nozzle 411 to be sprayed onto the rice paper only in a region in the spray cover 412 without scattering to the outside.

Pressing Device 50

Figure 15:
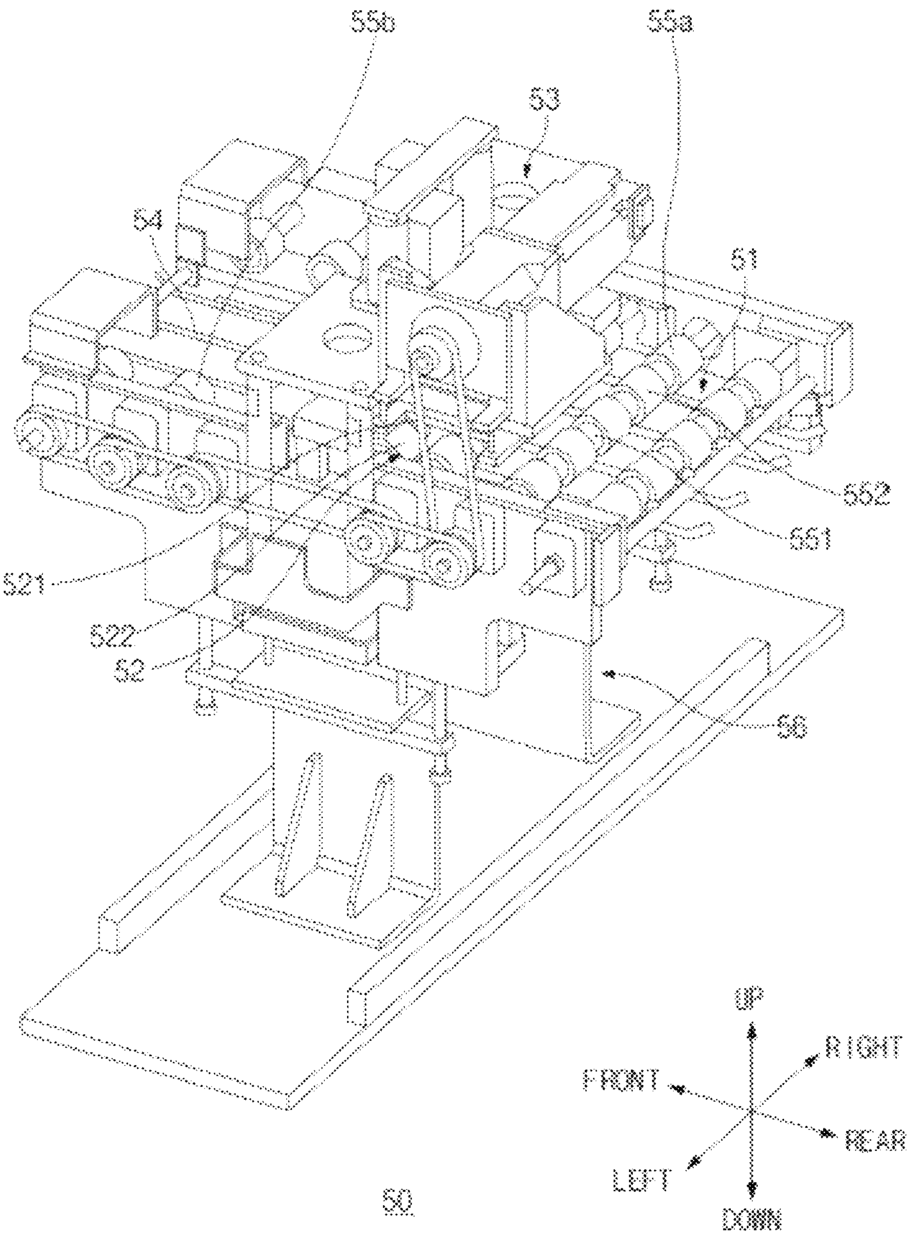
FIG. 15 is a perspective view of a pressing device of the system for manufacturing edible food products according to the embodiment of the present disclosure.
Figure 16:
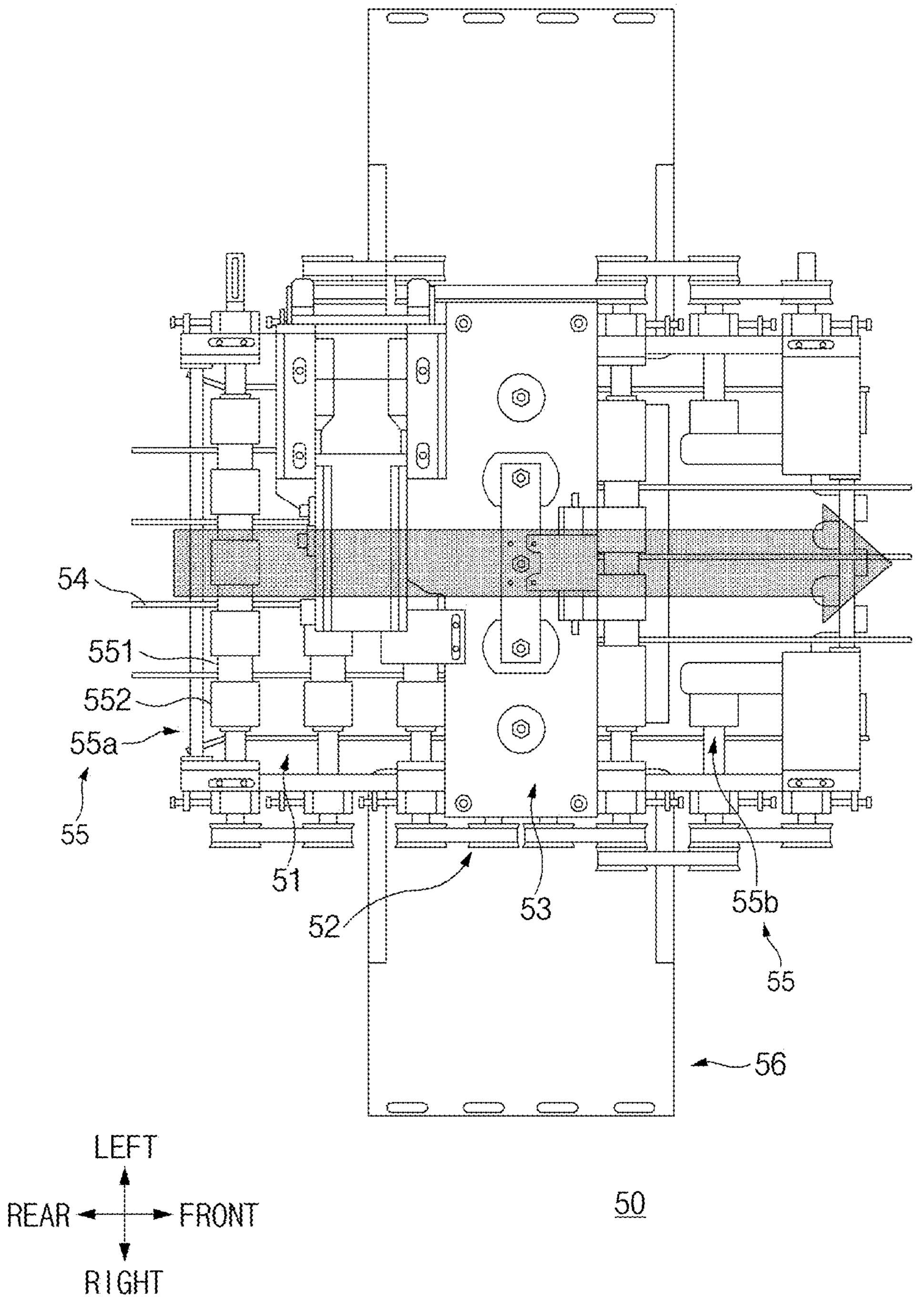
FIG. 16 is atop plan view of the pressing device of the system for manufacturing edible food products according to the embodiment of the present disclosure.
Figure 17:
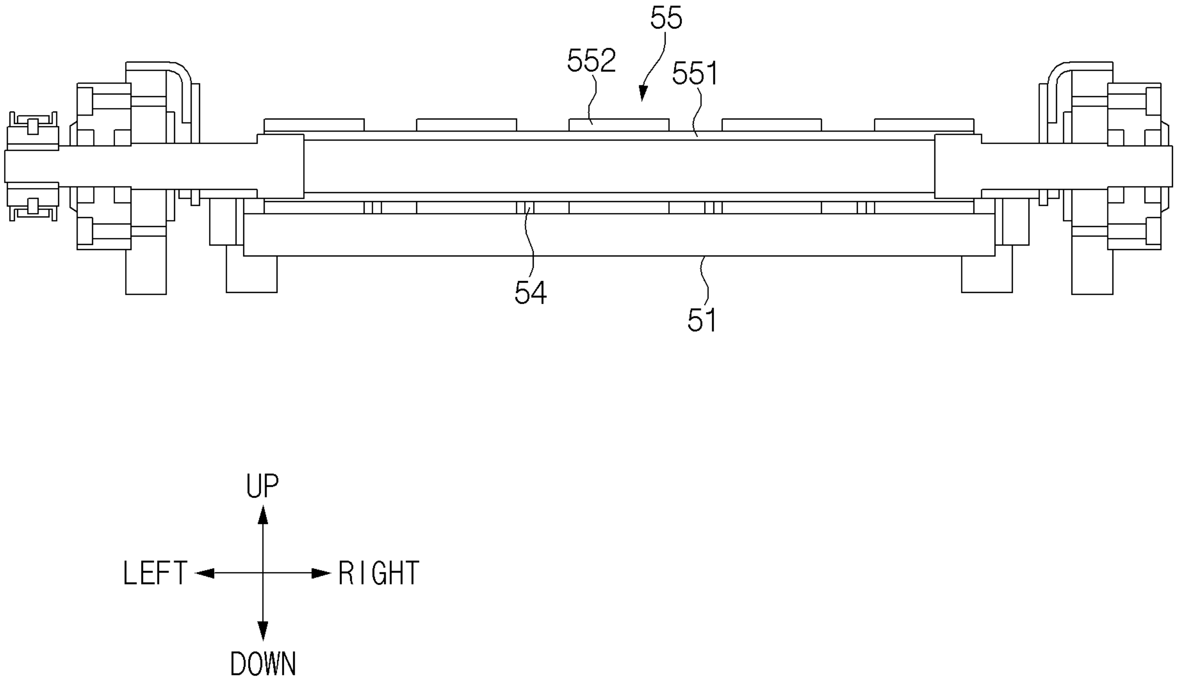
FIG. 17 is a rear view of the pressing device of the system for manufacturing edible food products according to the embodiment of the present disclosure.

FIG. 15 is a perspective view of the pressing device 50 of the system 1 for manufacturing edible food products according to the embodiment of the present disclosure. FIG. 16 is a top plan view of the pressing device 50 of the system 1 for manufacturing edible food products according to the embodiment of the present disclosure. FIG. 17 is a rear view of the pressing device 50 of the system 1 for manufacturing edible food products according to the embodiment of the present disclosure.

The pressing device 50 is provided to manufacture the seaweed snack SN by pressing the semi-finished product HG made by seating the supplied single sheet of seaweed SW on the supplied single sheet of rice paper RP. Therefore, the pressing device 50 may be disposed forward of the first food ingredient supply apparatus 20 and the second food ingredient supply apparatus 30. The pressing device 50 may press the seaweed and the rice paper against each other.

The pressing device 50 may include a pressing base part 51. The pressing base part 51 is provided such that the semi-finished product HG moves forward along an upper surface of the pressing base part 51. The pressing base part 51 serves to support the semi-finished product HG when a pressing roller 522 to be described below presses the semi-finished product HG. The pressing roller 522 may press downward the seaweed that constitutes an upper surface of the semi-finished product HG. Because the pressing base part 51 supports upward the rice paper constitutes a lower surface of the semi-finished product HG, the seaweed snack SN may be manufactured as the semi-finished product HG is interposed and pressed between the pressing roller 522 and the pressing base part 51.

The pressing device 50 may include a pressing lifting part 53. The pressing lifting part 53 may be disposed at a position spaced apart upward from the pressing base part 51 and configured to move upward or downward relative to the pressing base part 51. The pressing lifting part 53 may be coupled to a pressing frame 56 coupled to the pressing base part 51 may move upward or downward.

The pressing device 50 may include a pressing roller part 52. The pressing roller part 52 is coupled to the pressing lifting part 53 and configured to be rotatable about the axis defined in the leftward/rightward direction so as to press downward the semi-finished product HG that passes a lower side of the pressing roller part 52. As the pressing lifting part 53 moves upward or downward, the pressing roller part 52 may also move upward or downward.

The pressing roller part 52 may include the pressing roller 522 and a pressing shaft member 521. The pressing roller 522 may be provided as a plurality of pressing rollers 522. The plurality of pressing rollers 522 may be disposed to be spaced apart from one another in the leftward/rightward direction and coupled to the single pressing shaft member 521 extending in the leftward/rightward direction. The pressing roller 522 may be rotatably coupled to the pressing shaft member 521.

The pressing shaft member 521 may be coupled to the pressing lifting part 53 so as to be rotatable about the axis defined in the leftward/rightward direction. The pressing shaft member 521 may also be provided as a plurality of pressing shaft members 521, and the plurality of pressing shaft members 521 may be disposed to be spaced apart from one another in the forward/rearward direction. The pressing rollers 522, which are connected to the pressing shaft member 521 positioned at a relatively rear side, may move downward and primarily press the semi-finished product HG downward, and the pressing rollers 522, which are connected to the pressing shaft member 521 positioned at a relatively front side, may move downward and secondarily press the semi-finished product HG downward.

The pressing device 50 may include a pressing rail 54. The pressing rail 54 is a constituent element disposed to extend in the forward/rearward direction to prevent the semi-finished product HG from being wound around the pressing roller 522. The pressing rail 54 may be provided as a plurality of pressing rails 54. The pressing rail 54 may be disposed between the adjacent pressing rollers 522 spaced apart from each other in the leftward/rightward direction. The plurality of pressing rails 54 may be disposed to be spaced apart from one another in the leftward/rightward direction. The pressing rail 54 may be disposed below the pressing roller part 52. Therefore, because an upward motion of the semi-finished product HG, which enters the lower side of the pressing roller part 52, is restricted by the pressing rail 54, the semi-finished product HG may not be wound around the pressing roller 522 even though the pressing roller 522 rotates in the state in which the semi-finished product HG is pressed downward by the pressing roller 522.

The pressing device 50 may include guide roller parts 55. The guide roller part 55 is rotatably disposed at a position spaced apart upward from the pressing base part 51 so as to guide the semi-finished product HG between the pressing roller 522 and the pressing base part 51. The guide roller part 55 may also be rotatably coupled to the pressing frame 56 and rotate by receiving driving power. The guide roller part 55 may come into contact with the upper surface of the semi-finished product HG or the seaweed snack SN and transfer the semi-finished product HG or the seaweed snack SN forward. The guide roller part 55 may be disposed on at least one of front and rear sides of the pressing roller part 52.

In the embodiment of the present disclosure, the guide roller part 55 is illustrated as including a front guide roller part 55*b* positioned forward of the pressing roller part 52, and a rear guide roller part 55*a* positioned rearward of the pressing roller part 52, but the arrangement is not limited thereto. The front guide roller parts 55*b* may not be provided over the entire pressing base part 51 in the leftward/rightward direction. Because the front guide roller parts 55*b* are disposed separately at the left and right sides of the pressing base part 51, a central portion, which is defined based on the leftward/rightward direction, may not be pressed by the front guide roller part 55*b*.

The guide roller part 55 may include a guide shaft member 551 and a guide roller 552. The guide roller 552 may be provided as a plurality of guide rollers 552. The plurality of guide rollers 552 may be disposed to be spaced apart from one another in the leftward/rightward direction and coupled to the single guide shaft member 551 extending in the leftward/rightward direction. The guide shaft member 551 may be coupled to the pressing frame 56 so as to be rotatable about the axis defined in the leftward/rightward direction. The guide roller 552 may be rotatably coupled to the guide shaft member 551.

The guide shaft member 551 may also be provided as a plurality of guide shaft members 551, and the plurality of guide shaft members 551 may be disposed to be spaced apart from one another in the forward/rearward direction. Regions occupied by the guide rollers 552 of the guide roller parts 55, which are different from one another, may overlap one another at one portion but may not overlap one another at another portion when viewed in the forward/rearward direction. The guide rollers 552 included in the guide roller parts 55, which are different from one another, may have different widths in the leftward/rightward direction. Because the plurality of guide rollers 552 is disposed as described above, the semi-finished product HG or the seaweed snack SN may be uniformly pressed without being pressed only in a partial region.

The pressing rail 54 may also be disposed between the adjacent guide rollers 552. Therefore, the pressing rail 54 may prevent the semi-finished product HG from being wound around the guide roller 552. In addition, front and rear ends of the pressing rail 54 may have shapes inclined upward with respect to the outside based on the forward/rearward direction. When the semi-finished product HG enters the lower side of the pressing roller part 52, the semi-finished product HG may be easily guided to the lower side of the pressing rail 54. When the seaweed snack SN exits the pressing device 50, the seaweed snack SN may slowly separate in a direction from the upper surface of the seaweed snack SN.

Intermediate Conveyor 61 and Auxiliary Joining Agent Spray Device 42

The system 1 for manufacturing edible food products according to the embodiment of the present disclosure may include the intermediate conveyor 61. The intermediate conveyor 61 may be disposed between the pressing device 50 and the cutting apparatus 70 and configured to deliver the seaweed snack SN. The intermediate conveyor 61 may be provided such that the seaweed snack SN unloaded from the pressing device 50 is seated on an upper surface of the intermediate conveyor 61. The intermediate conveyor 61 may rotate to transfer forward the seaweed snack SN seated on the upper surface of the intermediate conveyor 61. The intermediate conveyor 61 may rotate by receiving driving power so that the above-mentioned operation is possible.

The seaweed snack SN, which is unloaded from the pressing device 50, may be dried for a predetermined time for which the seaweed snack SN is transferred to the cutting apparatus 70 by the intermediate conveyor 61, such that the seaweed snack SN may become easy to cut by the cutting apparatus 70.

The system 1 for manufacturing edible food products according to the embodiment of the present disclosure may include the auxiliary joining agent spray device 42. The auxiliary joining agent spray device 42 is provided adjacent to the intermediate conveyor 61 to spray an auxiliary joining agent onto the upper surface of the seaweed snack SN transferred by the intermediate conveyor 61. The auxiliary joining agent spray device 42 may be penetrated by the intermediate conveyor 61 or disposed to cover the intermediate conveyor 61. Because the description of the auxiliary joining agent spray device 42 is identical to the description of the joining agent spray device 41, except that the rice paper is changed to the seaweed snack SN and the joining agent is changed to the auxiliary joining agent, the description of the auxiliary joining agent spray device 42 is replaced with the joining agent spray device 41.

Cutting Apparatus 70

Figure 18:
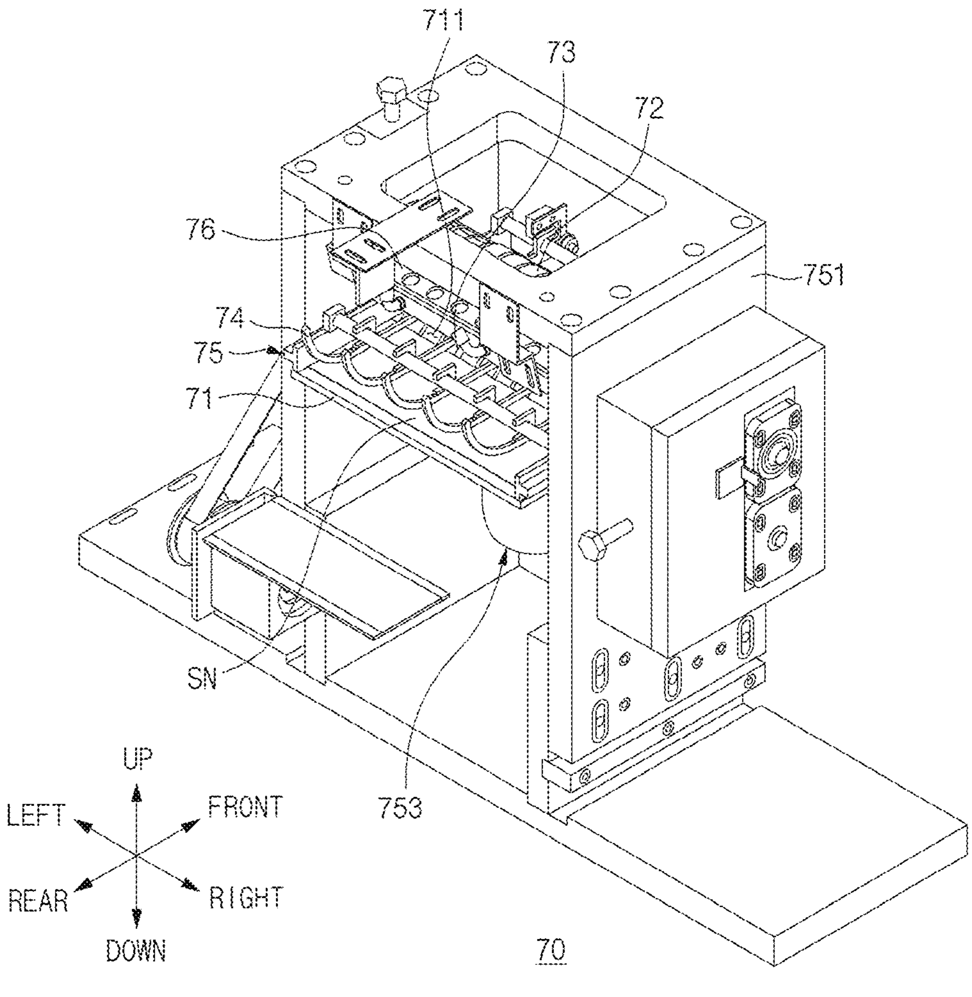
FIG. 18 is a perspective view illustrating that some constituent elements of a cutting apparatus of the system for manufacturing edible food products according to the embodiment of the present disclosure are exposed to the outside.
Figure 19:
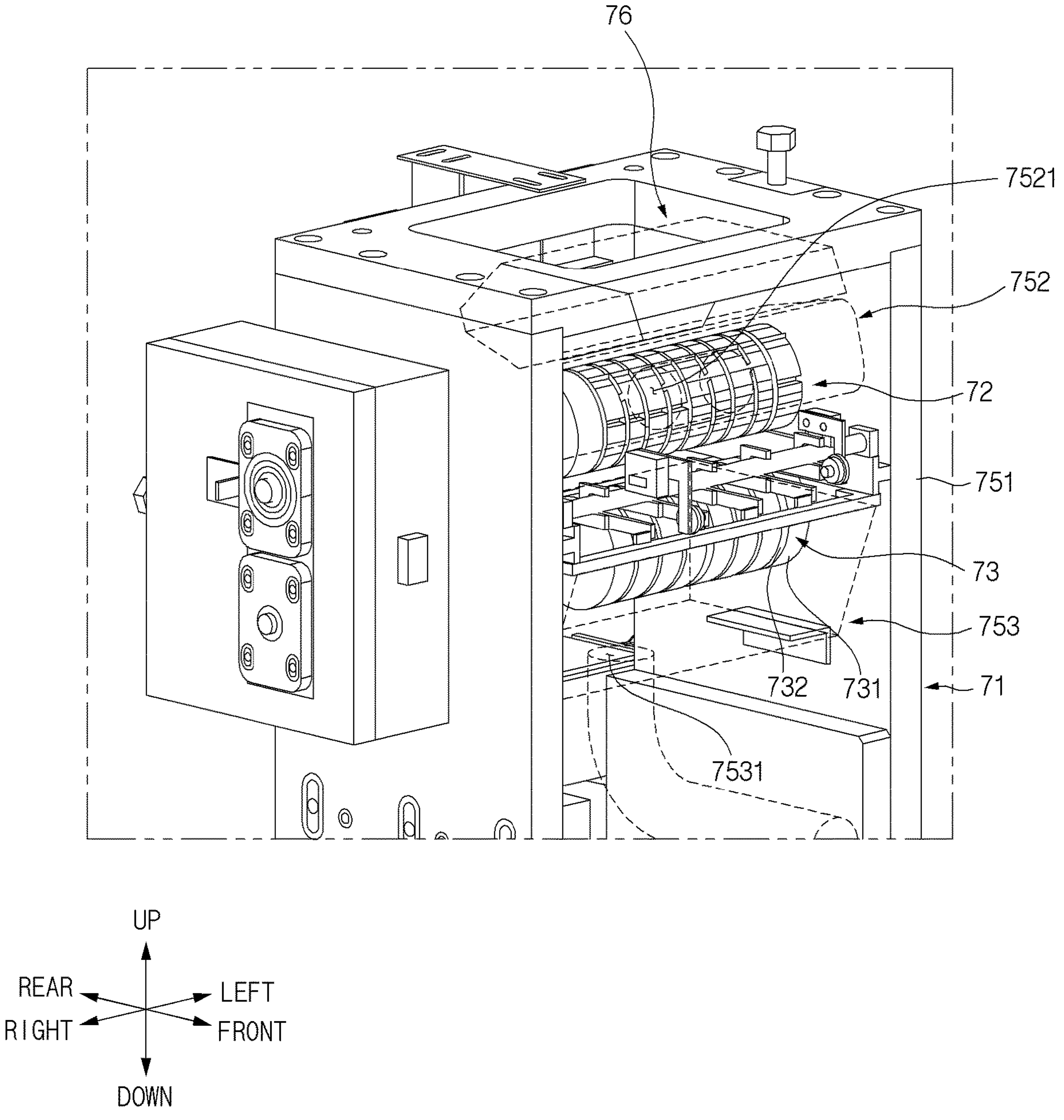
FIG. 19 is a perspective view illustrating that some constituent elements of the cutting apparatus of the system for manufacturing edible food products according to the embodiment of the present disclosure are exposed to the outside when viewed in another direction.
Figure 20:
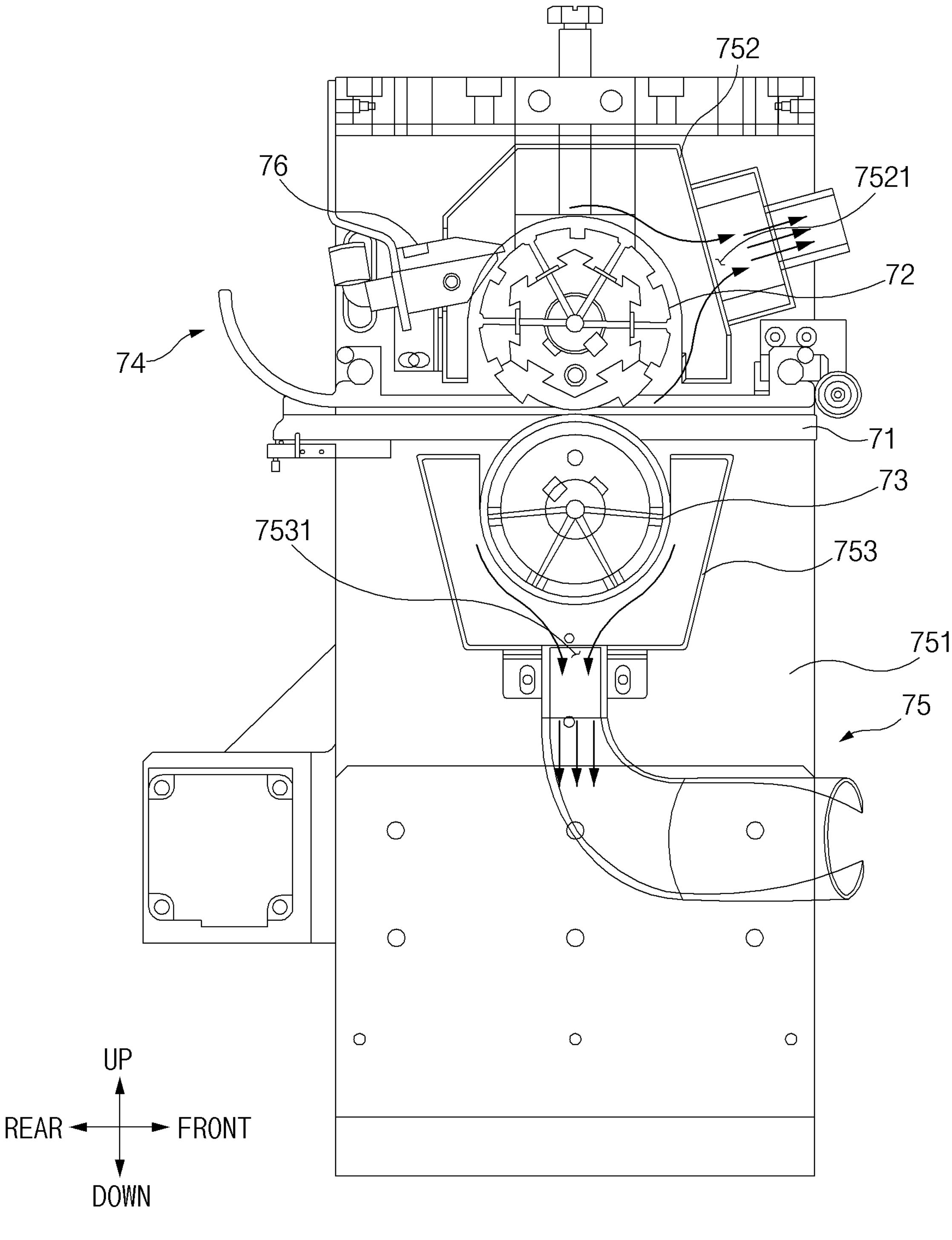
FIG. 20 is a right side view illustrating that some constituent elements of the cutting apparatus of the system for manufacturing edible food products according to the embodiment of the present disclosure are exposed to the outside.
Figure 21:
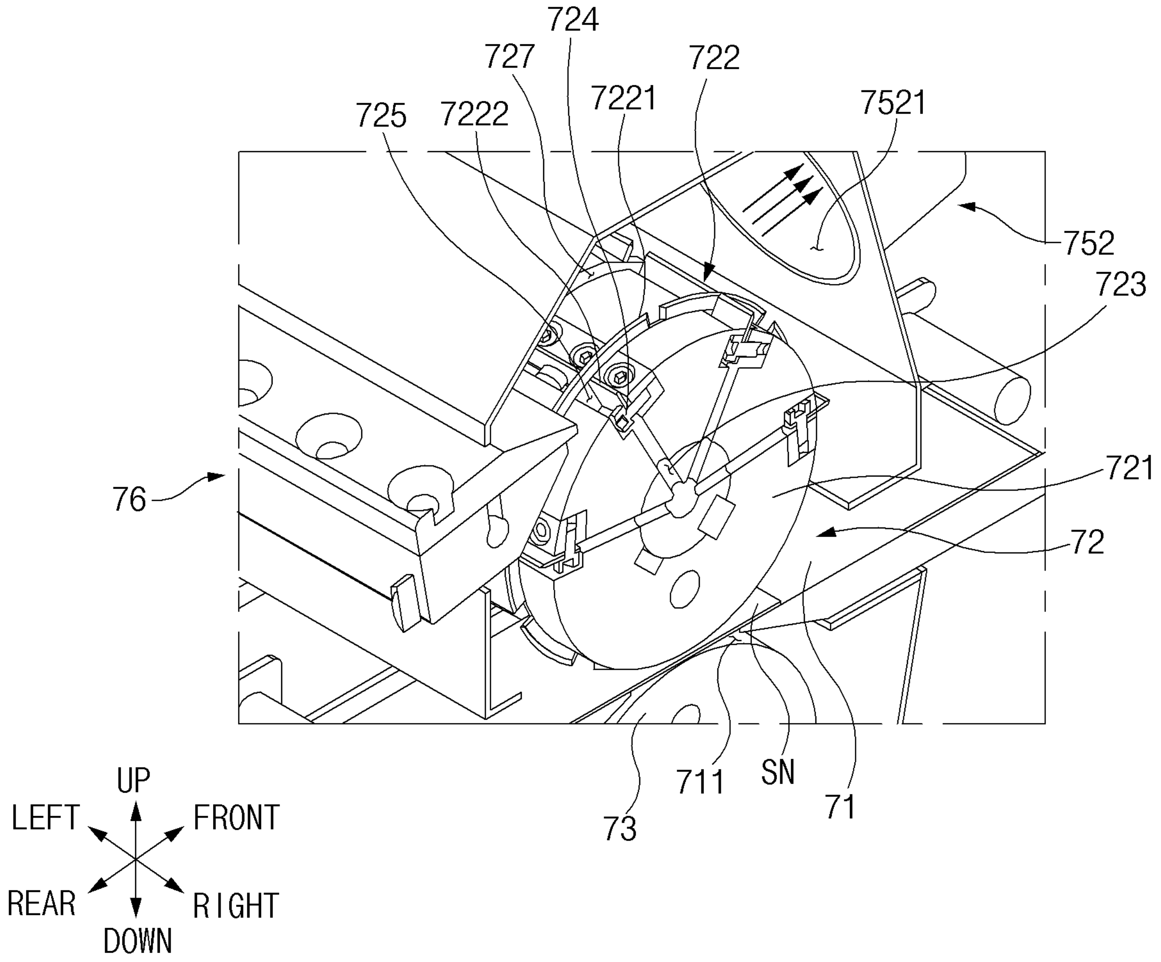
FIG. 21 is a view illustrating an internal structure of the cutting apparatus of the system for manufacturing edible food products according to the embodiment of the present disclosure.
Figure 22:
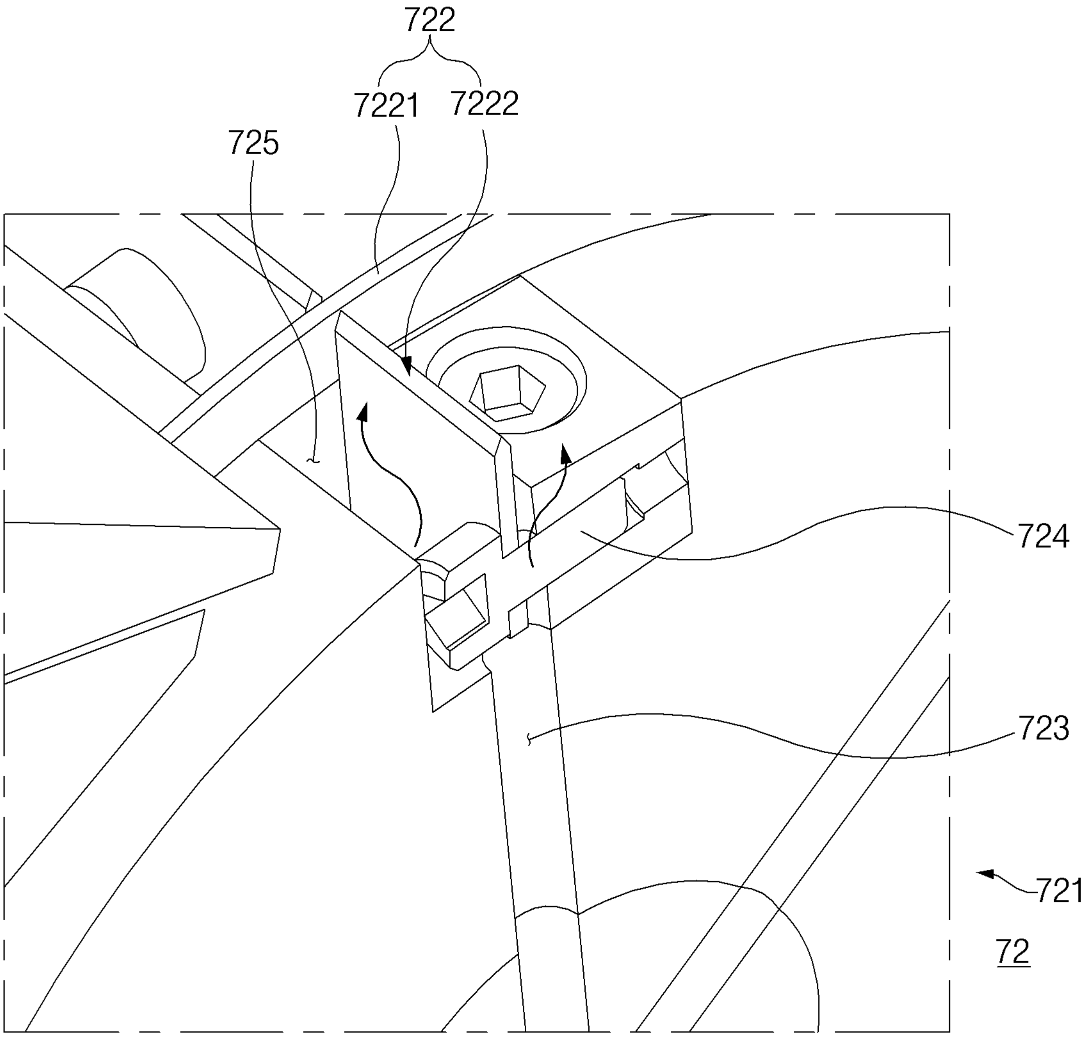
FIG. 22 is a detailed view illustrating a part of FIG. 21 in detail.

FIG. 18 is a perspective view illustrating that some constituent elements of the cutting apparatus 70 of the system 1 for manufacturing edible food products according to the embodiment of the present disclosure are exposed to the outside. FIG. 19 is a perspective view illustrating that some constituent elements of the cutting apparatus 70 of the system 1 for manufacturing edible food products according to the embodiment of the present disclosure are exposed to the outside when viewed in another direction. FIG. 20 is a right side view illustrating that some constituent elements of the cutting apparatus 70 of the system 1 for manufacturing edible food products according to the embodiment of the present disclosure are exposed to the outside. FIG. 21 is a view illustrating an internal structure of the cutting apparatus 70 of the system 1 for manufacturing edible food products according to the embodiment of the present disclosure. FIG. 22 is a detailed view illustrating a part of FIG. 21 in detail.

The system 1 for manufacturing edible food products according to the embodiment of the present disclosure may include the cutting apparatus 70. The cutting apparatus 70 is provided to cut the seaweed snack SN, which is unloaded from the pressing device 50, into a plurality of small pieces of unit snack SU. To receive the seaweed snack SN unloaded forward from the pressing device 50, the cutting apparatus 70 may be disposed forward of the pressing device 50 and disposed forward of the intermediate conveyor 61.

In the embodiment of the present disclosure, the cutting apparatus 70 may be a roller cutter including a roller having a cutting blade formed on a surface thereof and cut the seaweed snack SN by rotating the roller. However, the cutting apparatus 70 is not limited thereto. The cutting apparatus 70 may be a stamping machine configured to press and machine the seaweed snack by moving a stamp upward or downward. Alternatively, the cutting apparatus 70 may be a device, such as a straw cutter, for cutting the seaweed snack by moving a blade upward or downward.

The cutting apparatus 70 may include a cutting roller 72 and a cutting base part 71. The cutting roller 72 may be disposed above the cutting base part 71. The seaweed snack SN may be transferred forward along an upper surface of the cutting base part 71 and cut by the rotating cutting roller 72 into small pieces of unit snack SU, and then the unit snack SU may be unloaded forward.

The cutting base part 71 is disposed at a position facing the cutting roller 72 based on the seaweed snack SN in order to support the seaweed snack SN to be cut by the cutting roller 72. In the embodiment of the present disclosure, the cutting base part 71 may be disposed at a lower side based on the seaweed snack SN, and the cutting roller 72 may be disposed at an upper side based on the seaweed snack SN. Therefore, the seaweed snack SN may be transferred forward along the upper surface of the cutting base part 71. An auxiliary opening 711 may be formed in the cutting base part 71. The auxiliary opening 711 may extend in the leftward/rightward direction and be opened in the upward/downward direction.

The cutting roller 72 may include a cutting body 721 and cutting blades 722. The cutting body 721 may have a cylindrical shape and be coupled to a cutting frame 75, which will be described below, so as to be rotatable about the axis defined in the leftward/rightward direction. The cutting body 721 may be disposed to be spaced apart upward from the cutting base part 71. The cutting blade 722 protrudes outward in a radial direction of the cutting body 721 further than a surface of the cutting body 721 in order to cut the seaweed snack SN provided in the forward/rearward direction. The cutting blade 722 is coupled to the cutting body 721, and a distal end of the cutting blade 722 protrudes outward further than an outer surface of the cutting body 721, such that the cutting blade 722 may come into contact with the seaweed snack SN and cut the seaweed snack SN when the cutting body 721 rotates. The cutting blade 722 may be inserted into the auxiliary opening 711 at the time of cutting the seaweed snack SN.

The cutting blades 722 may include a forward/rearward cutting blade 7221 and a leftward/rightward cutting blade 7222. The forward/rearward cutting blade 7221 is the cutting blade 722 extending in the circumferential direction of the cutting body 721. The forward/rearward cutting blade 7221 may come into contact with the seaweed snack SN and form a cut surface on the seaweed snack SN, the cut surface extending in the forward/rearward direction. Therefore, the forward/rearward cutting blade 7221 may cut the seaweed snack SN in the leftward/rightward direction. The leftward/rightward cutting blade 7222 is the cutting blade 722 extending in the leftward/rightward direction. The leftward/rightward cutting blade 7222 may come into contact with the seaweed snack SN and form a cut surface on the seaweed snack SN, the cut surface extending in the leftward/rightward direction. Therefore, the leftward/rightward cutting blade 7222 may cut the seaweed snack SN in the forward/rearward direction. The cutting blade 722 may be formed over the entire circumference of the cutting body 721 or formed on only a part of the circumference of the cutting body 721 when the cutting body 721 is viewed in the leftward/rightward direction.

A line made by extending the forward/rearward cutting blade 7221 and a line made by extending the leftward/rightward cutting blade 7222 may intersect each other. Therefore, the seaweed snack SN may be cut in the leftward/rightward direction and the forward/rearward direction by the cutting blade 722 and divided into a plurality of pieces of unit snack SU. In the embodiment, the leftward/rightward cutting blade 7222 and the forward/rearward cutting blade 7221 may intersect each other. The forward/rearward cutting blades 7221 may be continuously connected at the intersection point between the forward/rearward cutting blade 7221 and the leftward/rightward cutting blade 7222. However, the leftward/rightward cutting blade 7222 may be segmentalized by the forward/rearward cutting blade 7221.

The cutting roller 72 may further include cutting grooves 725 recessed inward from a surface of the cutting body 721 in the radial direction of the cutting body 721. A base portion of the cutting blade 722 is inserted into the cutting groove 725. A cutting edge of the cutting blade 722, which performs the cutting, may protrude outward in the radial direction of the cutting body 721 further than the surface of the cutting body.

The base portion of the cutting blade 722 may be coupled to the cutting body 721 in the cutting groove 725. The cutting roller 72 may include blade coupling bolts 724 configured to couple the cutting blades 722 to the cutting body 721 in a direction orthogonal to the direction in which the cutting blade 722 extends. The direction in which the blade coupling bolt 724 couples the cutting blade 722 to the coupling body may be a tangential direction of the cutting body 721 that may be defined at the position at which the blade coupling bolt 724 is disposed when the cutting body 721 is viewed in the leftward/rightward direction. To ensure a space in which the bolt may be coupled, the cutting groove 725 may be formed to have a width larger than a thickness of the cutting blade 722.

The cutting body 721 may have guide grooves 727. The guide groove 727 is formed to be recessed inward from the surface of the cutting body 721 in the radial direction of the cutting body 721. The cutting grooves 725 and the guide grooves 727 may be alternately disposed in the leftward/ rightward direction. A cutting guide rail 74 to be described below may be inserted into the guide groove 727. Because the guide groove 727 is present, the lower side of the seaweed snack SN may be supported by the cutting guide rail 74, and the forward movement of the seaweed snack SN or the operation of cutting the seaweed snack SN by the cutting blade 722 may not be hindered by the cutting roller 72.

The cutting roller 72 may include a spray hole 723. The spray hole 723 may be provided as a plurality of spray holes 723. The spray hole 723 is a hole formed through the cutting body 721 outward in the radial direction from the center of the cutting body 721 in order to spray gas outward in the radial direction of the cutting body 721 at the periphery of the cutting blade 722. Because the spray hole 723 is present, the spray hole 723 may blow particles, such as seaweed debris, which may remain on the cutting blade 722 at the time of cutting the seaweed snack SN, to separate the particles from the cutting blade 722, thereby allowing the cutting roller 72 to consistently and easily perform the cutting function.

The spray hole 723 may allow a cutting center hole, which is formed in the leftward/rightward direction at an innermost side of the cutting body 721, to communicate with the outside. The cutting center hole may be connected to a cutting blower configured to pump compressed gas, such that the cutting center hole may receive the compressed gas and discharge the compressed gas through the spray hole 723. The compressed gas may be compressed air.

The spray hole 723 may be formed in a bottom surface of the cutting groove 725 disposed inward of the blade coupling bolt 724 based on the radial direction of the cutting body 721. Therefore, because the gas discharged through the spray holes 723 flows at the periphery of the blade coupling bolts 724 and the cutting blades 722, the gas may flow while rotating about axes of the blade coupling bolts 724. Therefore, the gas may easily separate particles, which are present at the periphery of the blade coupling bolts 724 and the cutting blades 722, from the blade coupling bolts 724 and the cutting blades 722.

The cutting apparatus 70 may include the cutting frame 75. The cutting frame 75 may be a constituent element such as a framework to which the constituent elements of the cutting apparatus 70 are coupled so that relative positions between the constituent elements are fixed. The cutting base part 71 may be coupled to the cutting frame 75, and the cutting roller 72 may be rotatably coupled to the cutting frame 75.

The cutting frame 75 may include a main cutting frame 751 to which the cutting base part 71 is coupled, and a first cutting cover 752 coupled to the main cutting frame 751. The first cutting cover 752 covers the cutting roller 72. The first cutting cover 752 covers the cutting roller 72 so that the cutting roller 72 is positioned in a space formed between the first cutting cover 752 and the cutting base part 71. Therefore, the first cutting cover 752 may be disposed above the cutting base part 71.

The cutting frame 75 may include a second cutting cover 753 coupled to the main cutting frame 751. The second cutting cover 753 may cover an auxiliary roller 73 so that the auxiliary roller 73 is positioned in a space formed between the second cutting cover 753 and the cutting base part 71. Therefore, the second cutting cover 753 may be disposed below the cutting base part 71.

The cutting apparatus 70 may include a cutting suction part. A first cutting suction part may be connected to a first cover inlet port 7521 formed in the first cutting cover 752. The first cutting suction part provides negative pressure to the first cover inlet port 7521, such that debris exiting at the periphery of the cutting roller 72 positioned in the first cutting cover 752 may be sucked through the first cover inlet port 7521. The first cover inlet port 7521 may be disposed forward of the cutting body 721 and opened in a direction inclined upward in the forward direction.

The cutting apparatus 70 may include a second cutting suction part. The second cutting suction part may be connected to a second cover inlet port 7531 formed in the second cutting cover 753. The second cutting suction part provides negative pressure to the second cover inlet port 7531, such that debris exiting at the periphery of the auxiliary roller 73 positioned in the second cutting cover 753 may be sucked into the second cover inlet port 7531. The second cover inlet port 7531 may be disposed below an auxiliary body 731 and opened downward. The first cutting suction part and the second cutting suction part may be a single common cutting suction blower 77.

The cutting apparatus 70 may include the auxiliary roller 73. The auxiliary roller 73 is disposed at a position facing the cutting roller 72 based on the seaweed snack SN to move the seaweed snack SN forward and support the seaweed snack SN when the cutting roller 72 cuts the seaweed snack SN. Like the cutting roller 72, the auxiliary roller 73 may be coupled to the cutting frame 75 so as to be rotatable about the axis defined in the leftward/rightward direction. The cutting roller 72 and the auxiliary roller 73 may be rotatably coupled to the main cutting frame 751. The cutting roller 72 and the auxiliary roller 73 may receive driving power from the same drive part. The cutting roller 72 and the auxiliary roller 73 may be gear-coupled to each other and operate in conjunction with each other. The auxiliary roller 73 and the cutting roller 72 may be disposed at sides opposite to each other based on the auxiliary opening 711.

The auxiliary roller 73 may include the auxiliary body 731 having a cylindrical shape and rotatably coupled to the cutting frame 75, and an auxiliary groove 732. An outer surface of the auxiliary body 731 may come into contact with the lower surface of the seaweed snack SN and support the seaweed snack SN upward while pushing the seaweed snack SN forward. The auxiliary groove 732 is a groove recessed inward from the auxiliary body 731 in the radial direction of the auxiliary body 731 so that the cutting blade 722, which protrudes outward in the radial direction of the cutting body 721 further than the surface of the cutting body 721, may be inserted into the auxiliary groove 732. The cutting blade 722 may be inserted into the auxiliary groove 732 when the cutting process is performed. Because the cutting blade 722 is inserted into the auxiliary groove 732, the auxiliary roller 73 may support the seaweed snack SN without colliding with the cutting blade 722.

The cutting apparatus 70 may include an air knife 76. The air knife 76 may be disposed to face the cutting blade 722 to spray air to the cutting blade 722. The air knife 76 may have a slit extending in the leftward/rightward direction and spray compressed air through the slit. The air knife 76 may be disposed to penetrate the first cutting cover 752 disposed rearward of the cutting roller 72. A direction in which the air knife sprays air may not be parallel to a direction of a tangential line formed at a point at which a straight line extending in the direction in which the air knife sprays air reaches the cutting body 721.

The cutting apparatus 70 may include the cutting guide rail 74. The cutting guide rail 74 is provided to prevent the seaweed snack SN from being wound around the cutting roller 72. The cutting guide rail 74 may extend in the forward/rearward direction. The cutting guide rail 74 may be provided as a plurality of cutting guide rails 74. The cutting guide rail 74 may be disposed below the surface of the cutting body 721. However, a lower end of the cutting guide rail 74 may be positioned above a lower end of the cutting blade 722. Therefore, an upward motion of the unit snack SU, which is cut by the cutting roller 72 and unloaded forward, is restricted by the cutting guide rail 74, such that the unit snack SU may not be wound around the cutting roller 72 even though the cutting roller 72 rotates. In addition, because the cutting guide rail 74 is positioned above the cutting blade 722, the cutting guide rail 74 may not hinder the cutting operation of the cutting blade 722.

To enable a height relationship between the cutting guide rail 74 and the cutting blade 722, the cutting guide rail 74 may come into contact with the cutting body 721 or be inserted into the guide groove 727 formed in the cutting body 721.

The cutting guide rail 74 may be provided as a plurality of cutting guide rails 74. The plurality of cutting guide rails 74 may be disposed to be spaced apart from one another in the leftward/rightward direction. A distance at which the cutting guide rails 74 are spaced apart from each other in the leftward/rightward direction may be a distance corresponding to a distance at which the guide grooves 727 are spaced apart from each other in the leftward/rightward direction.

Front and rear ends of the cutting guide rail 74 may have shapes inclined upward with respect to the outside based on the forward/rearward direction. When the seaweed snack SN enters the lower side of the cutting roller 72, the seaweed snack SN may be easily guided to the lower side of the cutting guide rail 74. When the unit snack SU exits the cutting apparatus 70, the unit snack SU may slowly separate in a direction from the upper surface of the unit snack SU.

Figure 23:
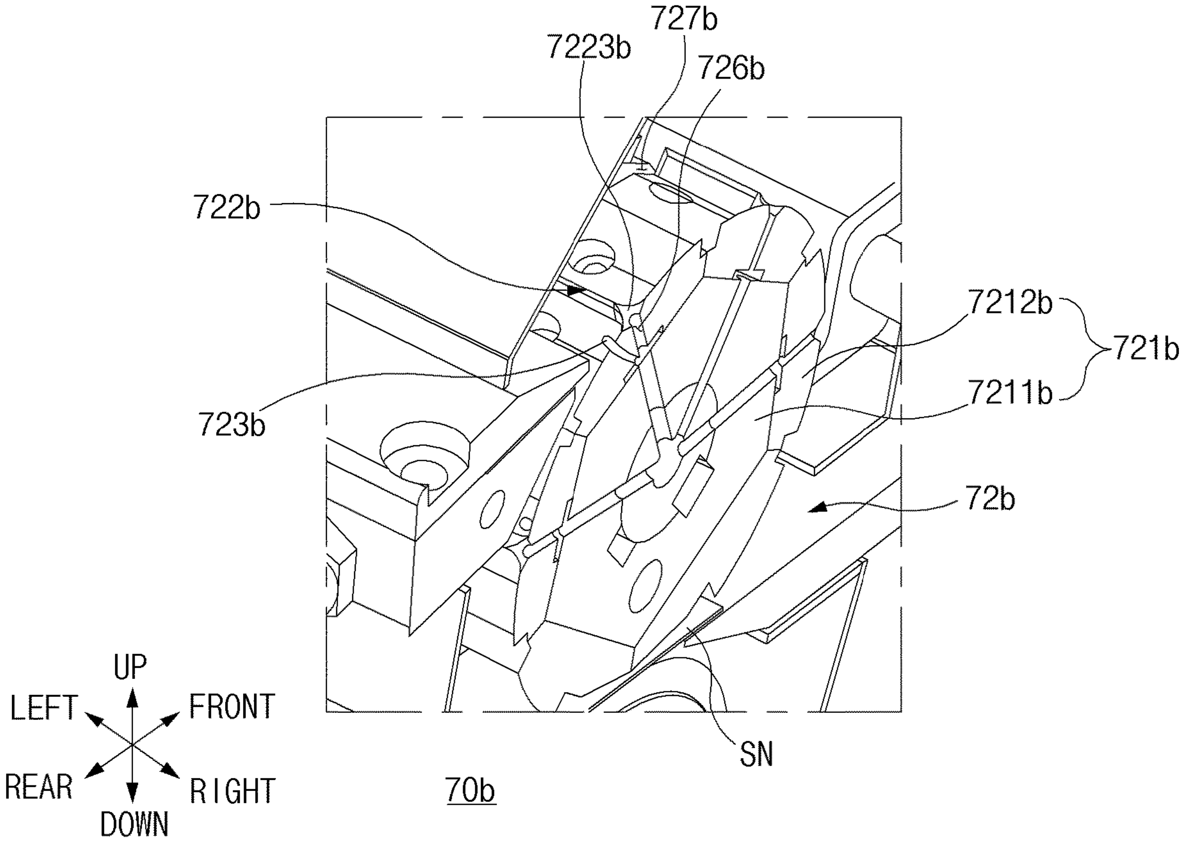
FIG. 23 is a view illustrating an internal structure of a cutting apparatus of a system for manufacturing edible food products according to a modified example of the embodiment of the present disclosure.
Figure 24:
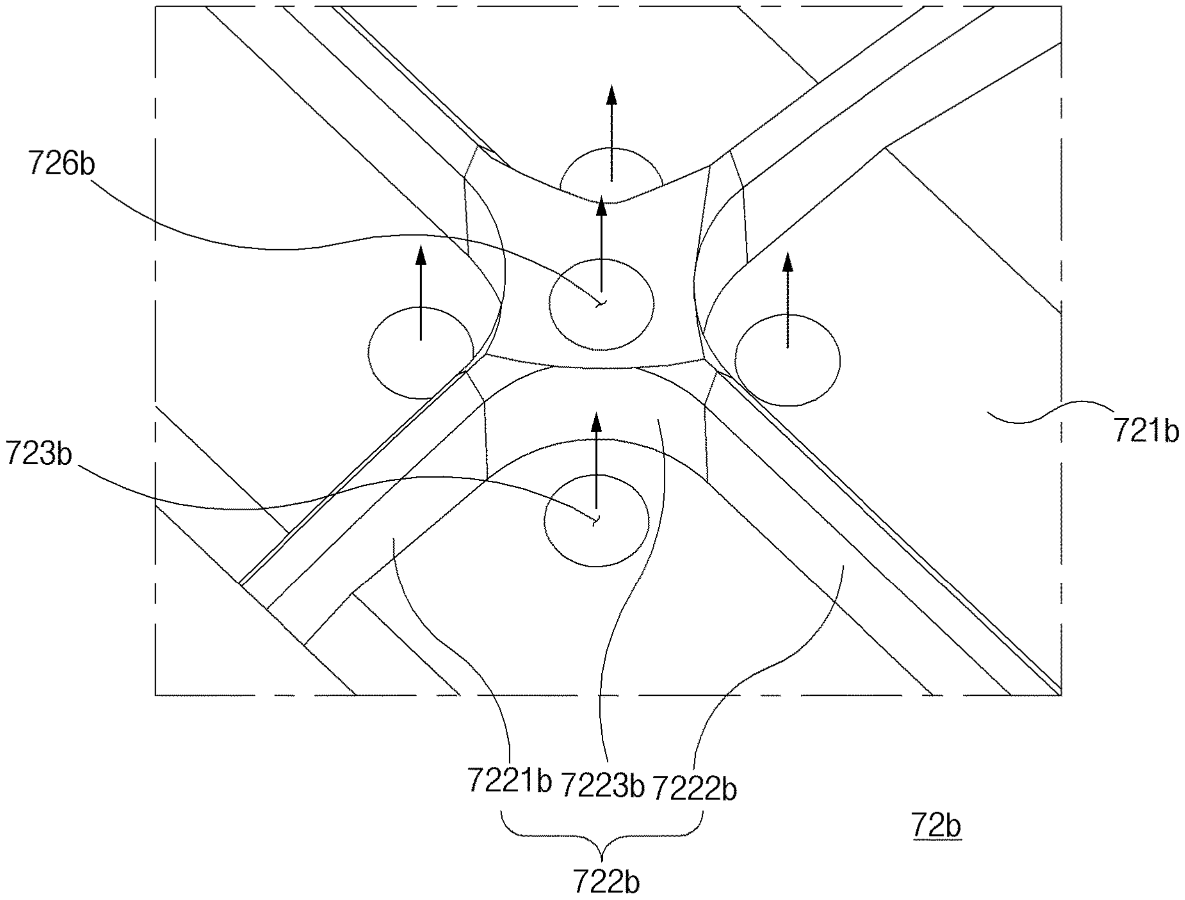
FIG. 24 is a detailed view illustrating a part of FIG. 23 in detail.

FIG. 23 is a view illustrating an internal structure of a cutting apparatus 70*b* of a system for manufacturing edible food products according to a modified example of the embodiment of the present disclosure. FIG. 24 is a detailed view illustrating a part of FIG. 23 in detail.

The cutting apparatus 70*b* according to the modified example of the embodiment of the present disclosure is different in shape from the cutting blade 722*b*. Therefore, only the difference will be further described. Because the description of the remaining parts of the cutting apparatus 70*b* is identical to the description of the cutting apparatus 70 according to the embodiment, the description of the remaining parts of the cutting apparatus 70*b* is replaced with the description of the cutting apparatus 70 according to the embodiment.

Cutting blades 722*b* according to the modified example of the embodiment of the present disclosure may include leftward/rightward cutting blades 7222*b*, forward/rearward cutting blades 7221*b*, and connection cutting blades 7223*b*. The connection cutting blade 7223*b* may be disposed at a position at which the forward/rearward cutting blade 7221*b* and the leftward/rightward cutting blade 7222*b* meet together. The connection cutting blade 7223*b* connects the forward/rearward cutting blade 7221*b* and the leftward/rightward cutting blade 7222*b*. Therefore, the forward/rearward cutting blade 7221*b* and the leftward/rightward cutting blade 7222*b* do not meet together but may be connected to each other by means of the connection cutting blade 7223*b*.

The connection cutting blade 7223*b* may have a curved surface that connects the forward/rearward cutting blade 7221*b* and the leftward/rightward cutting blade 7222*b*. That is, the connection cutting blade 7223*b* may serve to produce the unit snack SU having a rounded corner by chamfering the corner of the unit snack SU that may be cut into a rectangular shape by the leftward/rightward cutting blade 7222*b* and the forward/rearward cutting blade 7221*b*. The connection cutting blade 7223*b* may have a shape such as a rectangular shape having an edge concavely recessed inward when viewed in a radial direction of a cutting body 721*b*. A cutting edge of the connection cutting blade 7223*b* may have a shape concavely recessed inward in the radial direction of the cutting body 721*b* between the vertices.

A cutting roller 72*b* according to the modified example of the embodiment of the present disclosure may not include the cutting groove 725. However, although not illustrated, an embodiment including both the cutting groove 725 and the connection cutting blade 7223*b* may be carried out. In addition, as illustrated, the cutting roller 72*b* may include guide grooves 727*b*. Because the cutting roller 72*b* may not include the cutting groove 725, the plurality of guide grooves 727*b* may be disposed in the leftward/rightward direction at positions at which the cutting blade 722*b* is not formed.

Spray holes 723*b* according to the modified example of the embodiment of the present disclosure may be disposed at the periphery of the connection cutting blades 7223*b*. In the drawings, a total of four spray holes 723*b* are illustrated as being disposed, but the number of spray holes 723*b* is not limited thereto.

The cutting roller 72*b* according to the modified example of the embodiment of the present disclosure may include connection spray holes 726*b*. The connection spray hole 726*b* is a hole formed through the connection cutting blade 7223*b* and the cutting body 721*b* outward in the radial direction of the cutting body 721*b* in order to spray gas outward in the radial direction of the cutting body 721*b*. Remnants and debris of the seaweed snack SN, which may be produced when the connection cutting blade 7223*b* cuts the seaweed snack SN, may be removed by the spray holes 723*b* and the connection spray holes 726*b*.

The connection spray hole 726*b* may be connected to the spray hole 723*b* in the cutting body 721*b*. The spray hole 723*b* and the connection spray hole 726*b* may be formed as the same hole formed outward in the radial direction from the center of the cutting body 721*b* and separated from each other before the spray hole 723*b* and the connection spray hole 726*b* reach the surface of the cutting body 721*b*.

The cutting body 721*b* of the cutting roller 72*b* according to the modified example of the embodiment of the present disclosure may include an outer cutting body 7212*b* and an inner cutting body 7211*b*. The inner cutting body 7211*b* may be provided at a central portion of the cutting body 721*b* in the radial direction. The outer cutting body 7212*b* may be coupled to an outer surface of the inner cutting body 7211*b* and define the cutting body 721 having a cylindrical shape. The outer cutting body 7212*b* may be coupled to the outer surface of the inner cutting body 7211*b* in a dovetail manner. The feature in which the cutting body 721*b* is divided into the inner and outer structures may also be applied to the cutting body 721 according to the embodiment of the present disclosure.

Unloading Conveyor 62

The system 1 for manufacturing edible food products according to the embodiment of the present disclosure may include the unloading conveyor 62. The unloading conveyor 62 may be disposed at the front end of the cutting apparatus 70 and configured to deliver the unit snack SU to subsequent processes. The subsequent processes may include a packaging process, a post-treatment process, and the like. The unloading conveyor 62 may be provided so that the unit snack SU unloaded from the cutting apparatus 70 is seated on an upper surface of the unloading conveyor 62. The unloading conveyor 62 may transfer forward the unit snack SU seated on the upper surface while rotating. The unloading conveyor 62 may rotate by receiving driving power so that the above-mentioned operation is possible.

Processor 80

The processor 80 is provided to control the system 1 for manufacturing edible food products. The processor 80 is a constituent element including an element capable of performing a logical operation that executes a control instruction. The processor 80 may include a central processing unit (CPU) or the like. The processor 80 may be connected to various types of constituent elements and perform control by transmitting signals according to the control instruction to the respective constituent elements. The processor 80 may be connected to various types of sensors or acquisition parts and receive the acquired information in the form of signals. Therefore, in the embodiment of the present disclosure, the processor 80 may be electrically connected to various types of constituent elements including the system for manufacturing the seaweed snack SN. Because the processor 80 may be electrically connected to the respective constituent elements, the processor 80 may be connected to the constituent element by means of a conductive wire. Alternatively, the processor 80 may have a communication module capable of performing wireless communication and communicate with the constituent element.

The system 1 for manufacturing edible food products according to the embodiment of the present disclosure may further include a storage medium, and control instructions, which are to be executed by the processor 80, may be stored in the storage medium and used. The storage medium may be a device such as a hard disk drive (HDD), a solid state drive (SSD), a server, a volatile medium, or a non-volatile medium, but the type of storage medium is not limited thereto. In addition, the storage medium may further store data or the like required for the processor 80 to perform the work.

The system 1 for manufacturing edible food products according to the embodiment of the present disclosure may further include an operation part 81. The operation part 81 may include a mechanical structure such as a switch or a button capable of being operated by the user, and a display device configured to display a state of the system 1 for manufacturing edible food products. The operation part 81 may be electrically connected to the processor 80. As illustrated, the operation part 81 may be disposed on an outer surface of a casing embedded with the processor 80, but the arrangement of the operation part 81 is not limited thereto.

Figure 25:
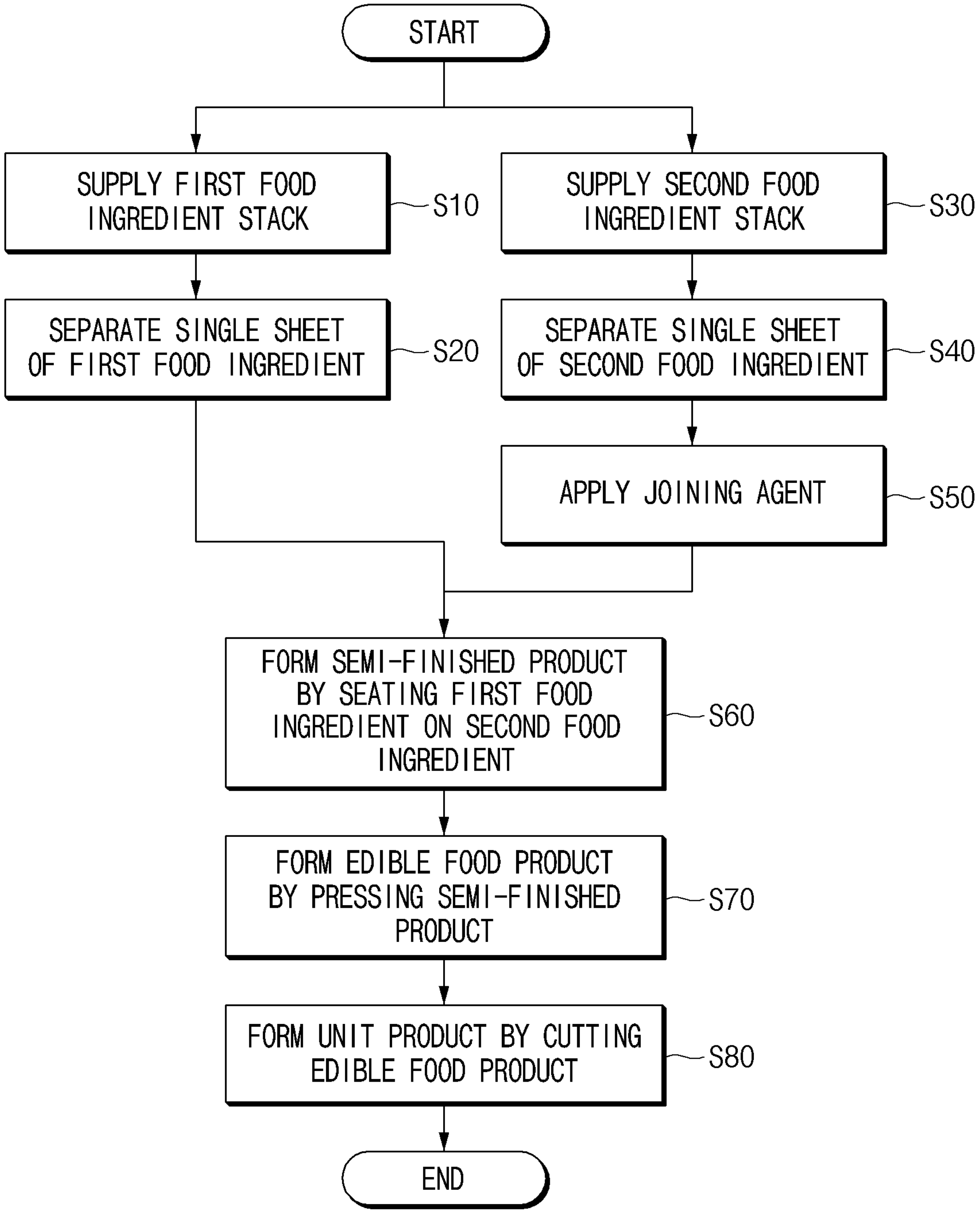
FIG. 25 is a flowchart of a method of manufacturing edible food products according to the embodiment of the present disclosure.
Figure 26:
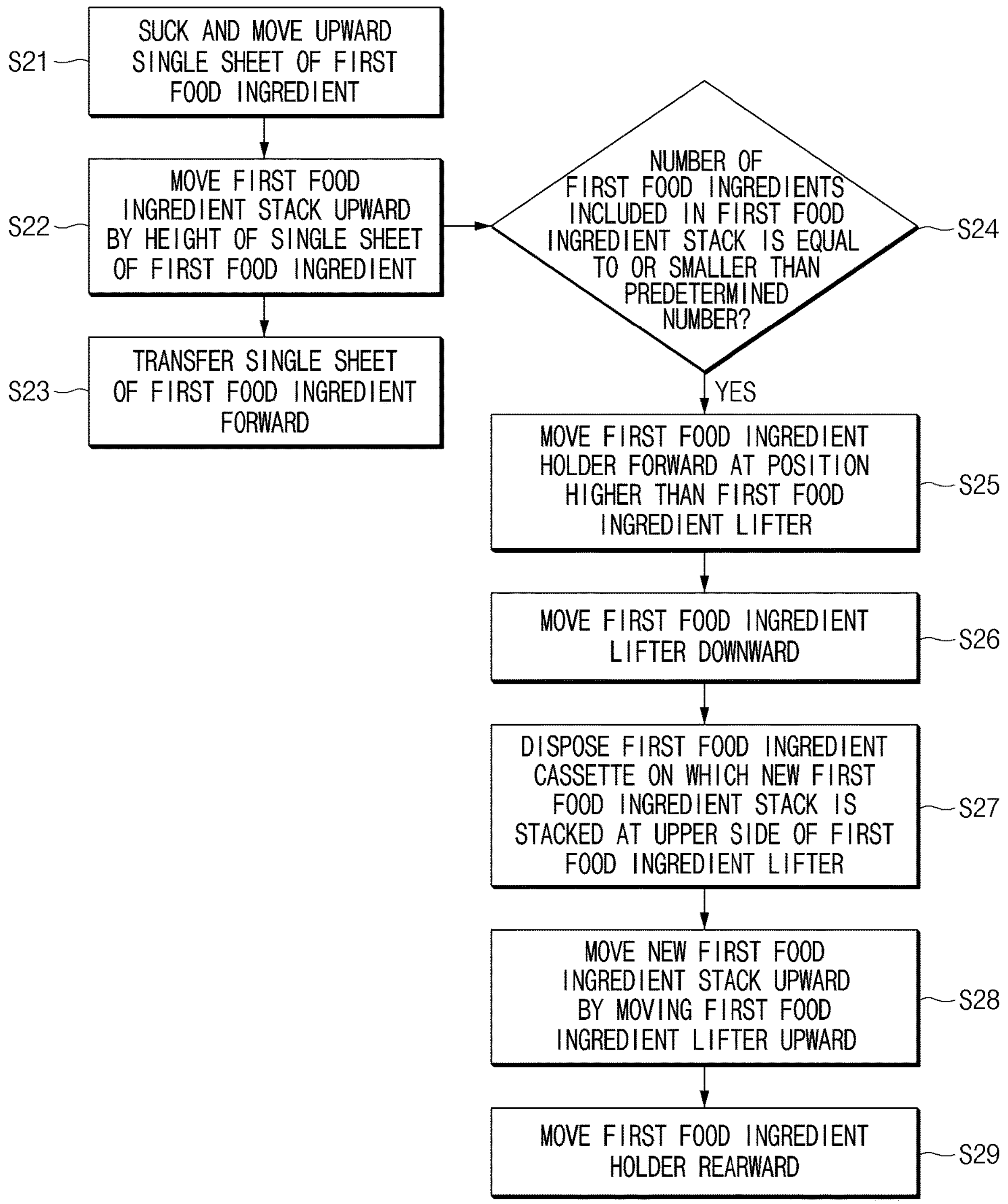
FIG. 26 is a flowchart of a first food ingredient supply method according to the embodiment of the present disclosure.
Figure 27:
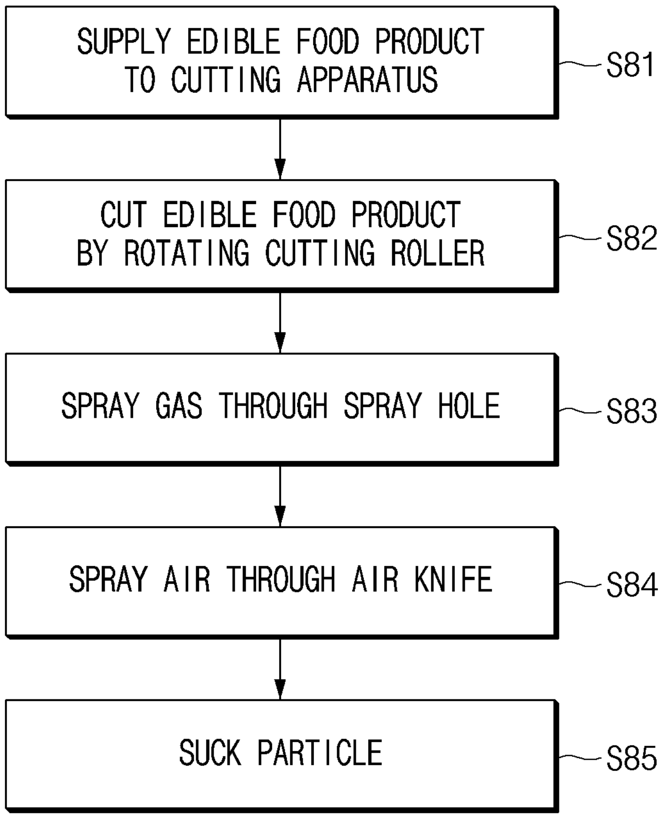
FIG. 27 is a flowchart of an edible food product cutting method according to the embodiment of the present disclosure.

FIG. 25 is a flowchart of a method of manufacturing edible food products according to the embodiment of the present disclosure. FIG. 26 is a flowchart of a first food ingredient supply method according to the embodiment of the present disclosure. FIG. 27 is a flowchart of an edible food product cutting method according to the embodiment of the present disclosure.

Hereinafter, a process in which the processor 80 manufactures the seaweed snack SN by controlling the respective constituent elements of the system 1 for manufacturing edible food products will be described. The flowchart in FIG. 26 may correspond to step S20 in FIG. 25 and be repeatedly performed. The flowchart in FIG. 27 may correspond to step S80 in FIG. 25.

The processor 80 may control the first food ingredient cassette movement part 25 and the second food ingredient cassette movement part 35 to allow the seaweed cassette WC, which is embedded with the seaweed stack WS, and the paper cassette PC, which is embedded with the paper stack PS, to move forward. That is, the processor 80 may supply the seaweed stack WS and the paper stack PS to the position at which the seaweed stack WS and the paper stack PS may be treated (S10 and S30).

The processor 80 may control the first food ingredient lifting part 21 to move the seaweed stack WS upward from the seaweed cassette WC on which the seaweed stack WS including the plurality of stacked seaweed sheets is seated. The processor 80 may control the first food ingredient lifter 212 so that the first food ingredient lifter 212 moves upward from the location below the seaweed stack WS. The processor 80 may control the first food ingredient separation part 22 to separate the single sheet of seaweed SW from the plurality of stacked seaweed sheets of the seaweed stack WS that has been moved upward. The suction block 221 of the first food ingredient separation part 22 may approach the seaweed, suck the single sheet of seaweed SW positioned at the upper end of the seaweed stack WS, move upward, and provide the single sheet of seaweed SW to the horizontal movement part 24 (S21), and the processor 80 may control the horizontal movement part 24 to transfer the single sheet of seaweed SW forward (S23). In case that the single sheet of seaweed SW is sucked and separated from the seaweed stack WS, the processor 80 may control the first food ingredient lifter 212 to move the first food ingredient lifter 212 upward so that the seaweed stack WS moves upward by a height of the single sheet of seaweed SW that has been sucked and moved (S22).

When the number of seaweed sheets included in the seaweed stack WS is a predetermined number (S24), the processor 80 may control the first food ingredient holder 213 so that the first food ingredient holder 213 moves forward at a position higher than the first food ingredient lifter 212 so that the first food ingredient holder 213 supports the seaweed stack WS (S25). Thereafter, the processor 80 may perform control to move the first food ingredient lifter 212 downward (S26). After the first food ingredient lifter 212 is moved downward, the processor 80 may control the first food ingredient cassette movement part 25 so that a cassette on which a new seaweed stack WS is seated is disposed at the upper side of the first food ingredient lifter 212 (S27).

After the step of disposing the seaweed cassette WC at the upper side of the first food ingredient lifter 212, the processor 80 may perform control to move the first food ingredient lifter 212 upward (S28). The processor 80 may perform control so that the first food ingredient holder 213, which has supported the seaweed stack WS, moves rearward so that the seaweed stack WS is seated on the new seaweed stack WS moved upward by the first food ingredient lifter 212 (S29).

The processor 80 may perform a control process similar to a process of controlling the first food ingredient lifting part 21 by using the second food ingredient lifting part 31. The processor 80 may control the second food ingredient separation part 32 to separate the single sheet of rice paper RP from the plurality of stacked rice paper sheets (S40). The processor 80 may perform control so that the second food ingredient holding member 322 grips, by suction, the single sheet of rice paper RP positioned at the upper end among the plurality of rice paper sheets included in the paper stack PS. The processor 80 may control the swing arm 321 to move the second food ingredient holding member 322 so that the single sheet of rice paper RP is transferred to the second food ingredient transfer part 33.

The processor 80 may control the first food ingredient transfer part 23 and the second food ingredient transfer part 33 so that the single sheet of seaweed SW and the single sheet of paper move forward. In this case, the processor 80 may control the first food ingredient transfer part 23, the second food ingredient transfer part 33, and the second food ingredient holding roller 34 so that the single sheet of seaweed SW is positioned between the seaweed position fixing bars and the single sheet of rice paper RP is positioned between the second food ingredient position fixing bars 333. In addition, the processor 80 may control the joining agent spray device 41 to spray the joining agent onto the upper surface of the rice paper (S50).

The processor 80 may control the first food ingredient transfer part 23 and the second food ingredient transfer part 33 so that the separated single sheet of seaweed SW is seated on the separated single sheet of rice paper RP to form the semi-finished product HG (S60). The processor 80 may control the first food ingredient transfer part 23 and the second food ingredient transfer part 33 so that the single sheet of seaweed SW and the single sheet of rice paper RP move forward at the same speed and the single sheet of seaweed SW is seated on the single sheet of rice paper RP.

The processor 80 may control the pressing device 50 so that the semi-finished product HG, which has been moved forward and delivered to the pressing device 50, is pressed to form the seaweed snack SN (S70). Thereafter, the processor 80 may control the intermediate conveyor 61 to move forward the seaweed snack SN unloaded from the pressing device 50 (S81). The unit snack SU may be produced by cutting the seaweed snack SN (S80). The processor 80 may control the cutting apparatus 70 so that the seaweed snack SN, which has been delivered to the cutting apparatus 70 by the intermediate conveyor 61, is cut to form the unit snack SU. However, the method of producing the unit snack SU by cutting the seaweed snack SN is not limited thereto, and various methods, such as a pressing method using a stamping machine or a cutting process using a straw cutter, may be used.

After the situation in which the seaweed snack SN reaches the position at which the seaweed snack SN may be cut is identified, the processor 80 may control the cutting apparatus 70 so that the cutting roller 72 rotates and cut the seaweed snack SN (S82), and the processor 80 may control the blowers to spray gas so that particles present at the periphery of the cutting blade 722 are removed. Specifically, the processor 80 may allow gas to be sprayed through the spray hole 723 at the periphery of the cutting blade 722 (S83), and the processor 80 may use the air knife 76 to spray air toward the cutting blade 722 (S84). After the spray process is performed, the processor 80 may control the first cutting suction part and the second cutting suction part to suck particles (S85). The processor 80 may control the unloading conveyor 62 so that the unit snack SU unloaded from the cutting apparatus 70 is moved to the subsequent process.

All the constituent elements, which constitute the embodiment of the present disclosure, may be integrally coupled or operate by being combined, but the present disclosure is not necessarily limited to the embodiment. That is, one or more of the constituent elements may be selectively combined and operated within the object of the present disclosure. In addition, unless explicitly described to the contrary, the words “comprise,” “include,” or “have” and variations such as “comprises,” “comprising,” “includes,” “including,” has,” or “having,” should be understood to imply the inclusion of stated elements but not the exclusion of any other elements. Unless otherwise defined, all terms including technical or scientific terms may have the same meaning as commonly understood by those skilled in the art to which the present disclosure pertains. The terms such as those defined in a commonly used dictionary may be interpreted as having meanings consistent with meanings in the context of related technologies and may not be interpreted as ideal or excessively formal meanings unless explicitly defined in the present disclosure.

The above description is simply given for illustratively describing the technical spirit of the present disclosure, and those skilled in the art to which the present disclosure pertains will appreciate that various changes and modifications are possible without departing from the essential characteristic of the present disclosure. Therefore, the embodiments disclosed in the present disclosure are provided for illustrative purposes only but not intended to limit the technical spirit of the present disclosure. The scope of the technical spirit of the present disclosure is not limited thereby. The protective scope of the present disclosure should be construed based on the following claims, and all the technical spirit in the equivalent scope thereto should be construed as falling within the scope of the present disclosure.

The invention claimed is:

1. A system for manufacturing edible food products, the system comprising:

a first food ingredient supply apparatus configured to separate a single sheet of a first food ingredient from a first food ingredient stack including a plurality of stacked first food ingredients and supply the single sheet of first food ingredient;

a second food ingredient supply apparatus configured to separate a single sheet of a second food ingredient from a second food ingredient stack including a plurality of stacked second food ingredients and supply the single sheet of second food ingredient; and a pressing device configured to form an edible food product by pressing a semi-finished product formed by seating the supplied single sheet of the first food ingredient on the supplied single sheet of the second food ingredient, wherein the pressing device comprises:

a pressing base part provided such that the semi-finished product moves forward along an upper surface of the pressing base part;

a pressing lifting part disposed at a position spaced apart upward from the pressing base part and configured to move upward or downward relative to the pressing base part;

a pressing roller part coupled to the pressing lifting part and configured to be rotatable about an axis defined in a leftward/rightward direction so as to press downward the semi-finished product that passes a lower side of the pressing roller part; and a pressing rail extending in a forward/rearward direction to prevent the semi-finished product from being wound around the pressing roller part, wherein the pressing roller part comprises:

a pressing shaft member coupled to the pressing lifting part and configured to be rotatable about an axis defined in the leftward/rightward direction; and a plurality of pressing rollers disposed on the pressing shaft member so as to be spaced apart from one another in the leftward/rightward direction, and wherein the pressing rail is disposed between the plurality of pressing rollers.

2. The system of claim 1, wherein the second food ingredient supply apparatus comprises:

a second food ingredient separation part configured to grip and move the single sheet of the second food ingredient from the second food ingredient stack; and a second food ingredient transfer part configured to transfer the single sheet of the second food ingredient, which is transferred by the second food ingredient separation part, to the pressing device.

3. The system of claim 2, wherein the second food ingredient separation part comprises:

a second food ingredient holding member configured to grip, by suction, the single sheet of the second food ingredient positioned at an uppermost side among the plurality of second food ingredients included in the second food ingredient stack; and a swing arm having a distal end at which the second food ingredient holding member is disposed, the swing arm being configured to change a position of the second food ingredient holding member by rotating, and wherein the swing arm is coupled to the second food ingredient holding member so that a direction in which the second food ingredient holding member is arranged parallel to a position at which the single sheet of the second food ingredient is sucked and a position at which the single sheet of the second food ingredient is placed on the second food ingredient transfer part.

4. The system of claim 3, wherein the second food ingredient separation part moves the single sheet of the second food ingredient forward, wherein the second food ingredient holding member comprises three second food ingredient suction heads, and wherein among the three second food ingredient suction heads, two second food ingredient suction heads are disposed to be spaced apart from each other in a leftward/rightward direction orthogonal to a forward/rearward direction, and one second food ingredient suction head is disposed forward of the two second food ingredient suction heads.

5. The system of claim 2, wherein the second food ingredient transfer part comprises:

a second food ingredient conveyor configured to transfer the seated single sheet of the second food ingredient forward; and a plurality of second food ingredient position fixing bars disposed on the second food ingredient conveyor and spaced apart from one another in a forward/rearward direction, the plurality of second food ingredient position fixing bars protruding outward from the second food ingredient conveyor in the forward/rearward direction or an upward/downward direction, and wherein an interval between the two adjacent second food ingredient position fixing bars is larger than a length of the single sheet of the second food ingredient in the forward/rearward direction.

6. The system of claim 2, further comprising:

a joining agent spray device disposed adjacent to the second food ingredient transfer part and configured to spray a joining agent onto an upper surface of the single sheet of the second food ingredient transferred by the second food ingredient transfer part.

7. The system of claim 2, wherein the second food ingredient transfer part comprises a second food ingredient conveyor configured to transfer the seated single sheet of the second food ingredient forward, wherein the second food ingredient conveyor comprises a second food ingredient belt, and a second food ingredient roller configured to rotate the second food ingredient belt, and wherein the second food ingredient belt is formed to come into contact with a part of the second food ingredient without coming into contact with another part of the second food ingredient.

8. The system of claim 1, wherein the first food ingredient supply apparatus is disposed above the second food ingredient supply apparatus.

9. The system of claim 1, wherein the first food ingredient supply apparatus comprises:

a first food ingredient separation part configured to grip and move the single sheet of the first food ingredient from the first food ingredient stack; and a first food ingredient transfer part configured to transfer the single sheet of the first food ingredient, which is transferred by the first food ingredient separation part, to the pressing device, and wherein the first food ingredient transfer part comprises a first food ingredient transfer housing configured to surround an interior of the housing so that the interior is spatially separated from an outside of the housing.

10. The system of claim 1, wherein the pressing device further comprises a plurality of guide roller parts rotatably disposed at a position spaced apart upward from the pressing base part to guide the semi-finished product between the pressing roller part and the pressing base part.

11. The system of claim 10, wherein the plurality of guide roller parts is disposed to be spaced apart from one another in the forward/rearward direction, wherein the guide roller parts comprises:

a guide shaft member disposed to be rotatable about an axis defined in the leftward/rightward direction; and a plurality of guide rollers coupled to the guide shaft member so as to be spaced apart from one another in the leftward/rightward direction, and wherein regions occupied by the guide rollers included in the adjacent guide roller parts overlap one another at one portion and do not overlap one another at another portion when viewed in the forward/rearward direction.

12. The system of claim 1, further comprising:

a cutting apparatus provided to cut the edible food product, which is unloaded from the pressing device, into pieces of a unit product.

13. A method of manufacturing edible food products, the method comprising:

separating a single sheet of a first food ingredient from a plurality of stacked first food ingredients;

separating a single sheet of a second food ingredient from a plurality of stacked second food ingredients;

forming a semi-finished product by seating the separated single sheet of the first food ingredient on the separated single sheet of the second food ingredient; and forming an edible food product by pressing the semi-finished product using a pressing device, wherein the pressing device comprises:

a pressing base part provided such that the semi-finished product moves forward along an upper surface of the pressing base part;

a pressing lifting part disposed at a position spaced apart upward from the pressing base part and configured to move upward or downward relative to the pressing base part;

a pressing roller part coupled to the pressing lifting part and configured to be rotatable about an axis defined in a leftward/rightward direction so as to press downward the semi-finished product that passes a lower side of the pressing roller part; and a pressing rail extending in a forward/rearward direction to prevent the semi-finished product from being wound around the pressing roller part, wherein the pressing roller part comprises:

a pressing shaft member coupled to the pressing lifting part and configured to be rotatable about an axis defined in the leftward/rightward direction; and a plurality of pressing rollers disposed on the pressing shaft member so as to be spaced apart from one another in the leftward/rightward direction, and wherein the pressing rail is disposed between the plurality of pressing rollers.

14. The method of claim 13, further comprising:

producing a plurality of unit products by cutting the edible food product.

* * * * *